(12) United States Patent
Imaishi et al.

(10) Patent No.: US 10,065,557 B2
(45) Date of Patent: Sep. 4, 2018

(54) REAR-ROAD SURFACE ILLUMINATION APPARATUS

(71) Applicant: MITSUBISHI ELECTRIC CORPORATION, Tokyo (JP)

(72) Inventors: Akiko Imaishi, Tokyo (JP); Masami Aikawa, Tokyo (JP); Masato Hirai, Tokyo (JP); Reiko Sakata, Tokyo (JP); Hidebumi Arai, Tokyo (JP); Kei Kasuga, Tokyo (JP); Yumiko Ochiai, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 0 days.

(21) Appl. No.: 15/500,229

(22) PCT Filed: Aug. 19, 2014

(86) PCT No.: PCT/JP2014/071651
§ 371 (c)(1),
(2) Date: Jan. 30, 2017

(87) PCT Pub. No.: WO2016/027312
PCT Pub. Date: Feb. 25, 2016

(65) Prior Publication Data
US 2017/0259734 A1    Sep. 14, 2017

(51) Int. Cl.
*B60Q 1/52* (2006.01)
*G08G 1/16* (2006.01)
(Continued)

(52) U.S. Cl.
CPC ............ *B60Q 1/525* (2013.01); *B60Q 1/444* (2013.01); *G08G 1/166* (2013.01); *B60Q 5/006* (2013.01); *B60Q 2400/50* (2013.01)

(58) Field of Classification Search
None
See application file for complete search history.

(56) References Cited

U.S. PATENT DOCUMENTS

| 6,623,088 B2* | 9/2003 | Roden | B60T 7/042 303/11 |
| 8,823,552 B1* | 9/2014 | Raphael | B60Q 9/002 340/435 |

(Continued)

FOREIGN PATENT DOCUMENTS

| DE | 10 2006 050 548 A1 | 4/2008 |
| DE | 10 2006 059 684 A1 | 6/2008 |

(Continued)

OTHER PUBLICATIONS

Adachi et al. "Experimental Study on Speed Reduction Effect by Sequence Design", Japan Society of Civil Engineers Collected Papers D, 2010, vol. 66, No. 1, pp. 27-39.

*Primary Examiner* — Leon-Viet Nguyen
(74) *Attorney, Agent, or Firm* — Birch, Stewart, Kolasch & Birch, LLP

(57) ABSTRACT

A rear-road surface illumination apparatus is provided which includes: an avoidance determiner 30 to determine whether to provide a display to induce a following vehicle to avoid a vehicle, on the basis of vehicle information; and a controller 9 to cause an illumination light 10 to illuminate a rear road surface with light having illumination information that induces the following vehicle to avoid the vehicle when the avoidance determiner 30 determines to provide a display to induce the following vehicle to avoid the vehicle. Therefore, the rear-road surface illumination apparatus can indicate the existence of the vehicle to the following vehicle, to give the existence of the vehicle prominence, and can also make it (Continued)

easy to notify the driver of the following vehicle about what the driver of the vehicle desires the driver of the following vehicle to do.

2 Claims, 17 Drawing Sheets

(51) Int. Cl.
*B60Q 1/44* (2006.01)
*B60Q 5/00* (2006.01)

(56) References Cited

U.S. PATENT DOCUMENTS

| | | | |
|---|---|---|---|
| 2006/0187010 A1* | 8/2006 | Berman | B60Q 1/50 340/435 |
| 2007/0159311 A1* | 7/2007 | Schober | B60Q 1/525 340/435 |
| 2016/0207443 A1* | 7/2016 | Widdowson | B60Q 1/0011 |

FOREIGN PATENT DOCUMENTS

| | | |
|---|---|---|
| DE | 10 2012 219 572 A1 | 4/2014 |
| JP | 3106966 U | 11/2004 |
| JP | 2006-309623 A | 11/2006 |
| JP | 2009-83772 A | 4/2009 |
| JP | 2009-113540 A | 5/2009 |
| JP | 2014-144725 A | 8/2014 |

\* cited by examiner

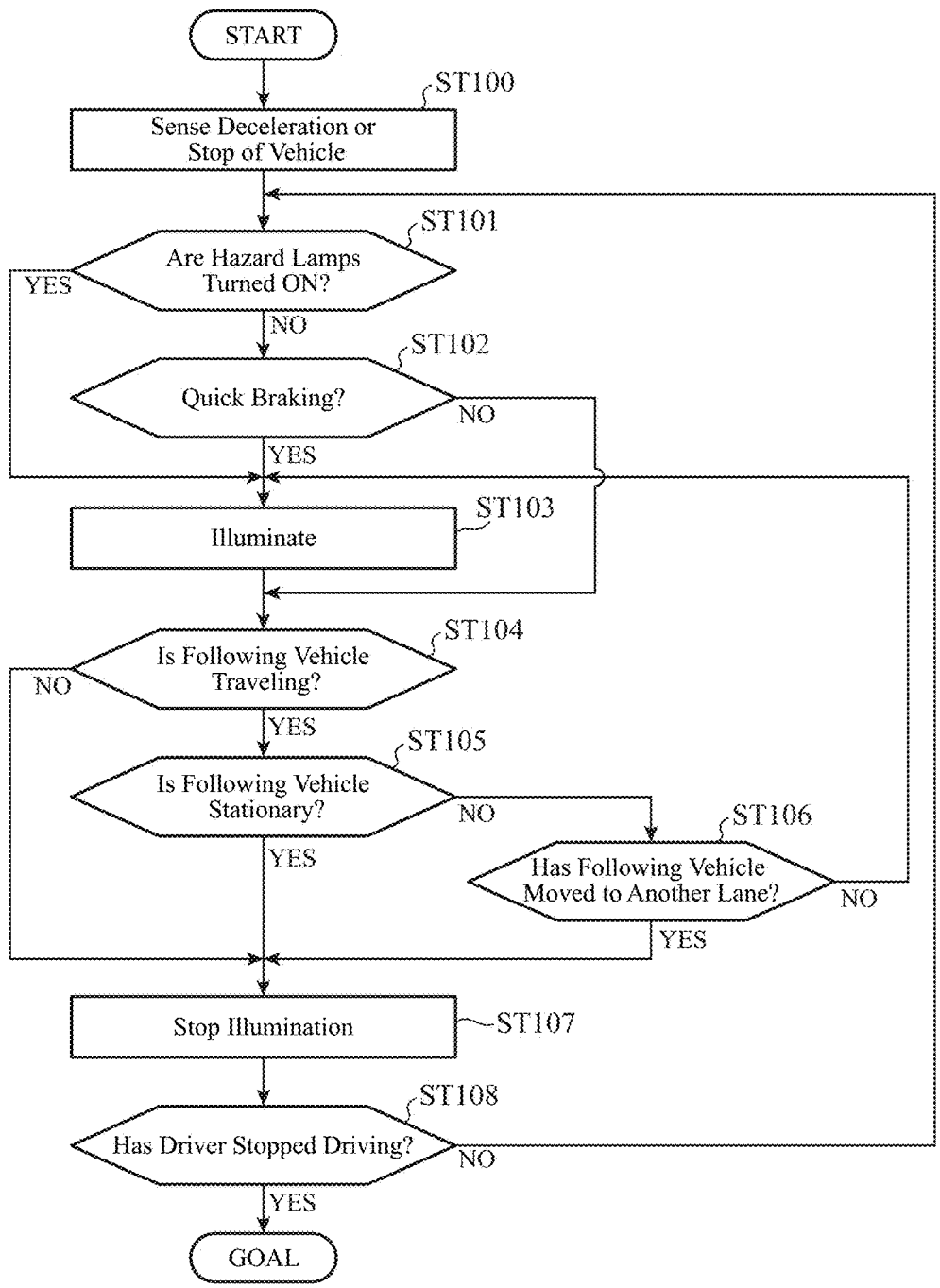

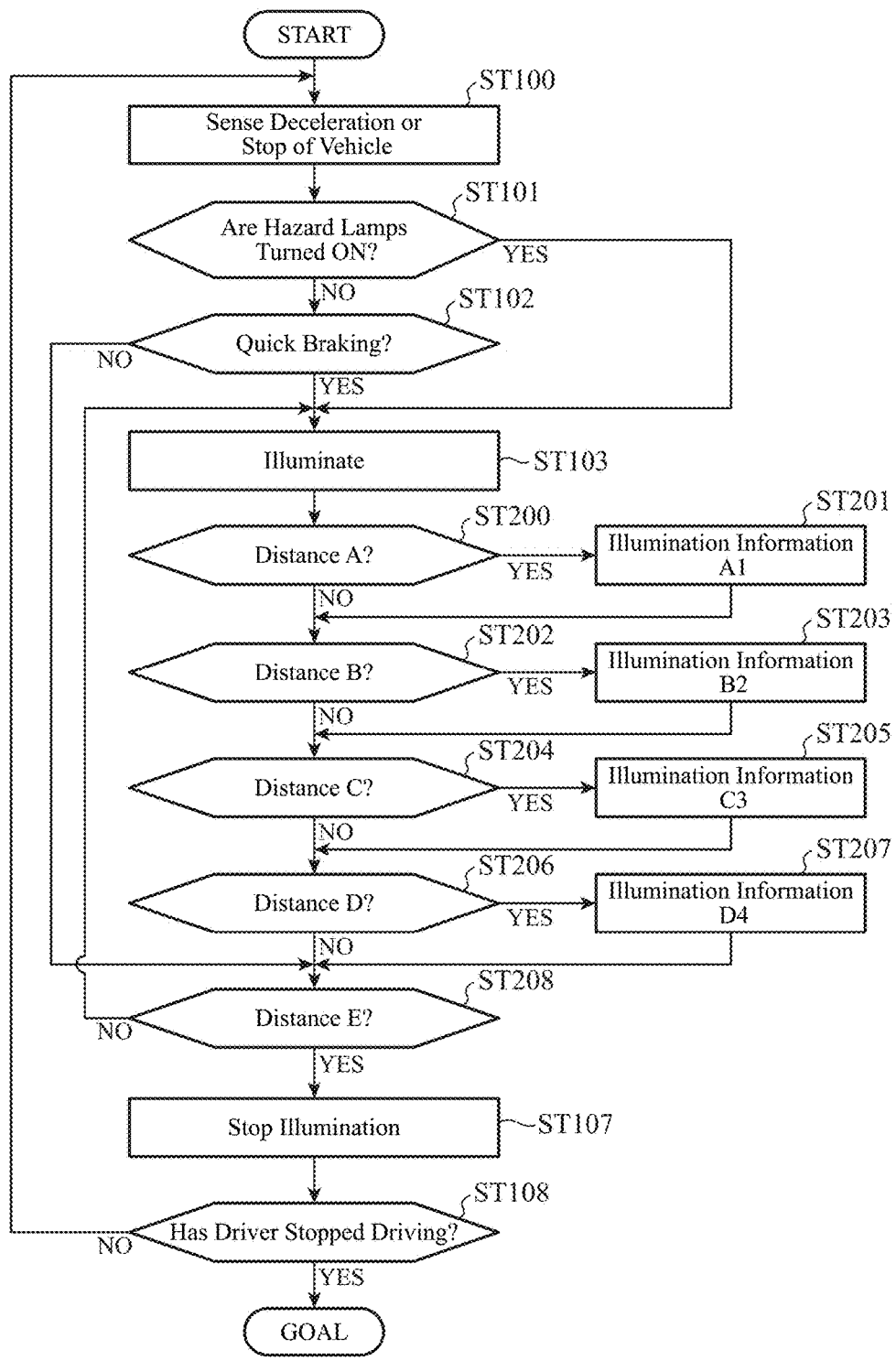

FIG.7

| Hazard Lamps | Vehicle State | Inter-Vehicle Distance to Following Vehicle | Distance | Illumination Information |
|---|---|---|---|---|
| Turned ON | Quick Braking, Start of Deceleration, Under Deceleration | Regardless of Existence or Non-Existence of Following Vehicle | Distance A | Illumination Information A1 |
| ON | Under Quick Braking, Start of Deceleration, Under Deceleration | Regardless of Existence or Non-Existence of Following Vehicle | Distance B | Illumination Information B1 |
| ON | Under Quick Braking, Under Deceleration, Not Moving | Following Vehicle Approaches (at Distance of 5 m or More) | Distance C | Illumination Information C1 |
| ON | Not Moving | Following Vehicle Approaches (at Distance of Less Than 5 m) | Distance D | Illumination Information D1 |
| OFF | Not Moving, Start of Travel | Following Vehicle is not Moving | Distance E | No Illumination |

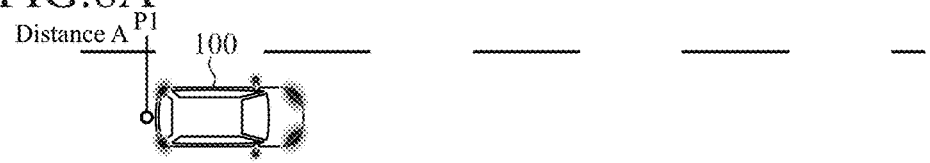
FIG.8A Distance A
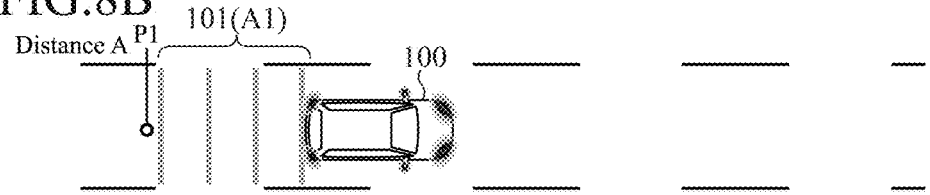
FIG.8B Distance A
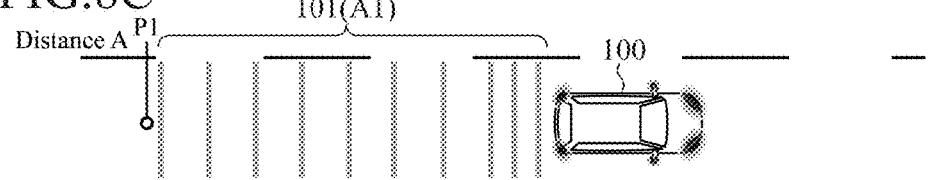
FIG.8C Distance A
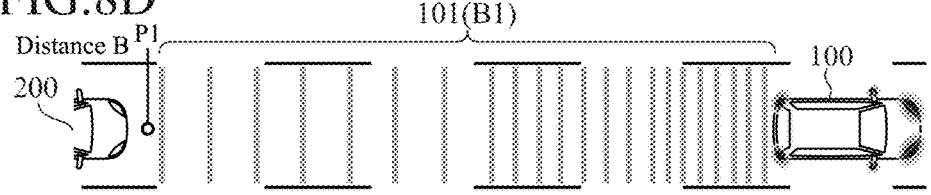
FIG.8D Distance B
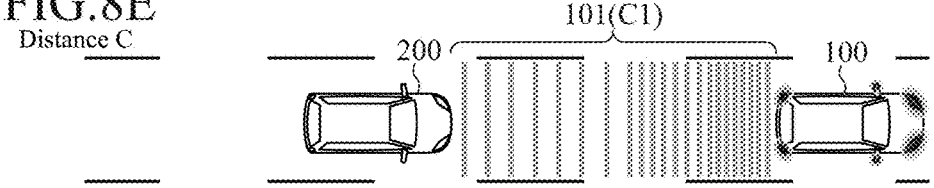
FIG.8E Distance C
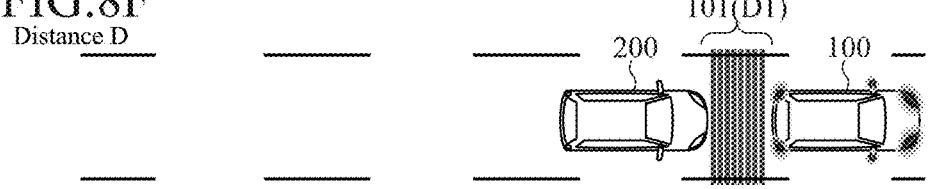
FIG.8F Distance D
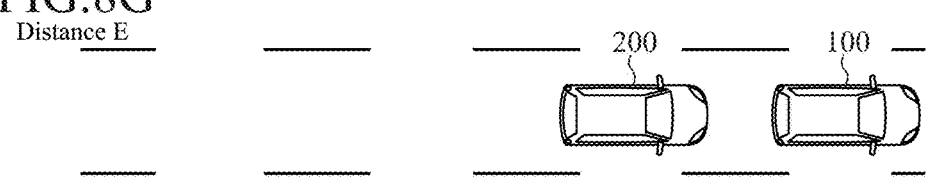
FIG.8G Distance E

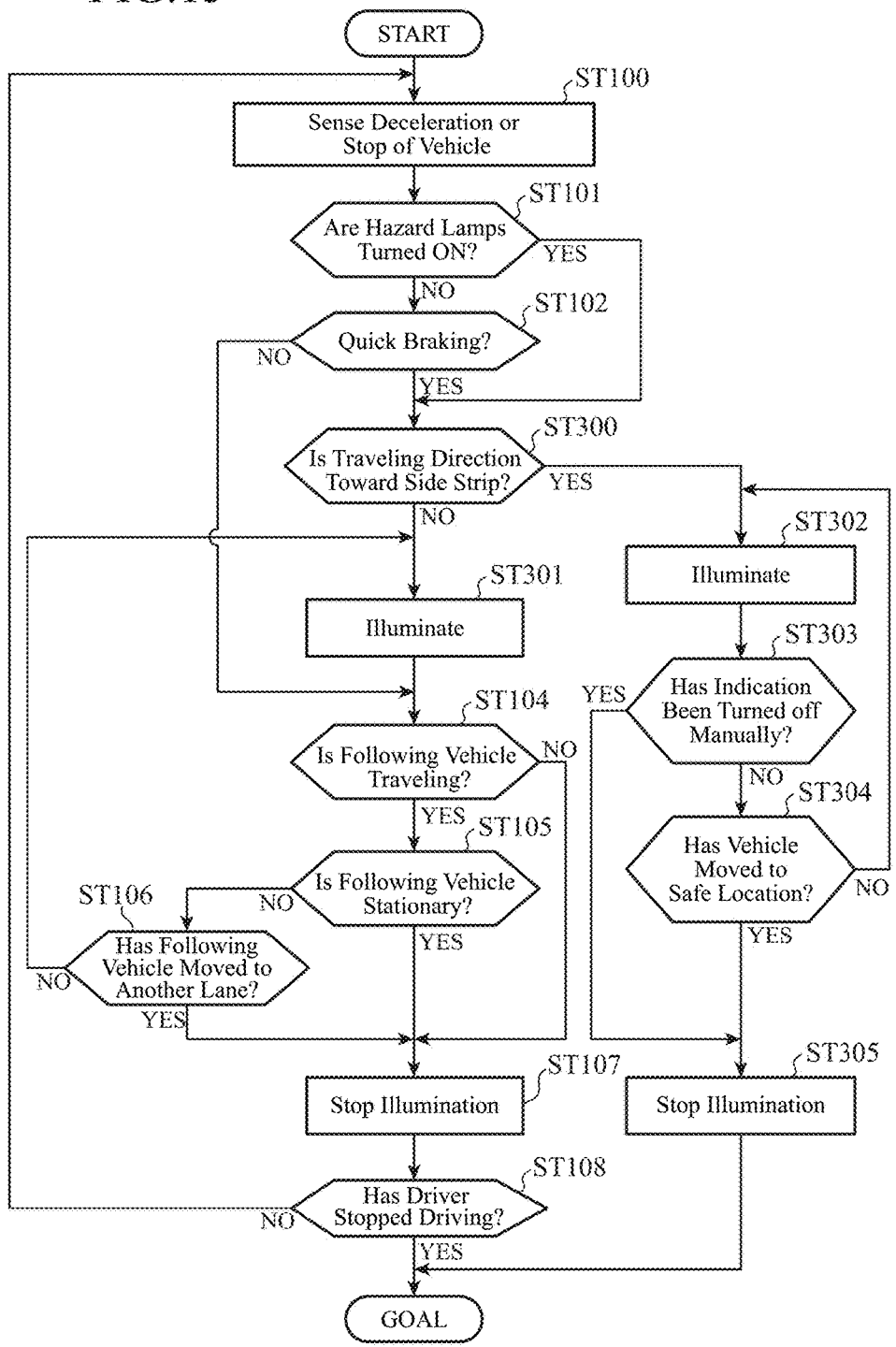

Distance A 102   100
Distance A 102   100
Distance A 102   100
Distance B 102   100
Distance C 102   100
Distance D 100
Distance E

REAR-ROAD SURFACE ILLUMINATION APPARATUS

TECHNICAL FIELD

The present invention relates to a rear-road surface illumination apparatus that illuminates a rear road surface behind a vehicle with light.

BACKGROUND ART

When making an emergency stop, the driver of a vehicle attracts the attention of the drivers of following vehicles by turning on its hazard lamps. Further, there is provided a technique of illuminating a road surface with a display showing a region which is dangerous to enter, thereby providing a warning particularly for two-wheeled vehicles and pedestrians (for example, refer to patent literature 1). Further, there is provided a technique of illuminating a rear road surface with characters of "STOP", thereby transmitting information also to following vehicles other than the following vehicle just behind the vehicle (for example, refer to patent literature 2).

CITATION LIST

Patent Literature

Patent Literature 1: Japanese Patent Application Publication No. 2009-33772.
Patent Literature 2: Japanese Patent Application Publication No. 2009-113540.

SUMMARY OF INVENTION

Technical Problem

The problem with the technique of tainting on the hazard lamps or illuminating a rear road surface with the characters of "STOP" in the above-mentioned way is that it is hard to be visible from the drivers of following vehicles, depending on environments, and it is therefore difficult for the drivers of following vehicles to notice at an early time that the hazard lamps are on or the rear road surface is illuminated with the characters.

Another problem with the technique of only illuminating the road surface with a display showing a dangerous region is that it is difficult to notify the drivers of following vehicles about why it's dangerous and what the driver of the vehicle desires the drivers of the following vehicles to do.

A further problem with the technique of only illuminating the road surface with the characters of "STOP" is that it is not possible to discriminate whether the driver desires to notify the driver of the following vehicle that the vehicle has stopped or that the driver of the vehicle desires the driver of the following vehicle to stop, while when such a concrete expression using characters is provided, the driver of the following vehicle needs to gaze at the characters to decipher the characters, and cannot grasp the intention intuitively.

The present invention is made in order to solve the above-mentioned problems, and it is therefore an object of the present invention to provide a rear-road surface illumination apparatus capable of indicating the existence of a vehicle which has made an emergency stop or decelerated for the purpose of an emergency stop to a following vehicle, to give the existence of the vehicle prominence, and also making it easy to notify the driver of the following vehicle about what the driver of the vehicle desires the driver of the following vehicle to do.

Solution to Problem

According to the present invention, there is provided a rear-road surface illumination apparatus which includes: a vehicle information acquisition unit to acquire vehicle information from vehicle-mounted equipment mounted in a vehicle; an avoidance determiner to determine whether to provide a display to induce a following vehicle to avoid said vehicle, on a basis of the vehicle information acquired by said vehicle information acquisition unit; and a controller to cause an illumination light mounted in the vehicle to illuminate a rear road surface with light having illumination information that induces said following vehicle to avoid said vehicle when the avoidance determiner determines to provide a display to induce said following vehicle to avoid said vehicle.

Advantageous Effects of Invention

According to the present invention, when it is determined to provide a display to induce a following vehicle to avoid a vehicle, the rear road surface is illuminated with the light having the illumination information that induces the following vehicle to avoid the vehicle, thereby making it possible to indicate the existence of the vehicle to the following vehicle, to give the existence of the vehicle prominence, and making it easy to notify the driver of the following vehicle about what the driver of the vehicle desires the driver of the following vehicle to do.

BRIEF DESCRIPTION OF DRAWINGS

FIG. 3 is a flow chart showing the operation of the rear-road surface illumination apparatus according to the first embodiment;

FIG. 5 is a flow chart showing the operation of the rear-road surface illumination apparatus according to the second embodiment;

FIG. 7 is a table showing criteria for determination at the distances A to E at each of which the vehicle is existing;

FIGS. 8A to 8G are diagrams showing examples of deceleration stop request displays having pieces of illumination information A1 to D1 respectively corresponding to the distances A to D at each of which the vehicle is existing;

FIG. 15 is a flow chart showing the operation of the rear rear-road surface illumination apparatus according to the third embodiment;

DESCRIPTION OF EMBODIMENTS

Hereafter, in order to explain this invention in greater detail, the preferred embodiments of the present invention will be described with reference to the accompanying drawings.

First Embodiment

Figure 1:
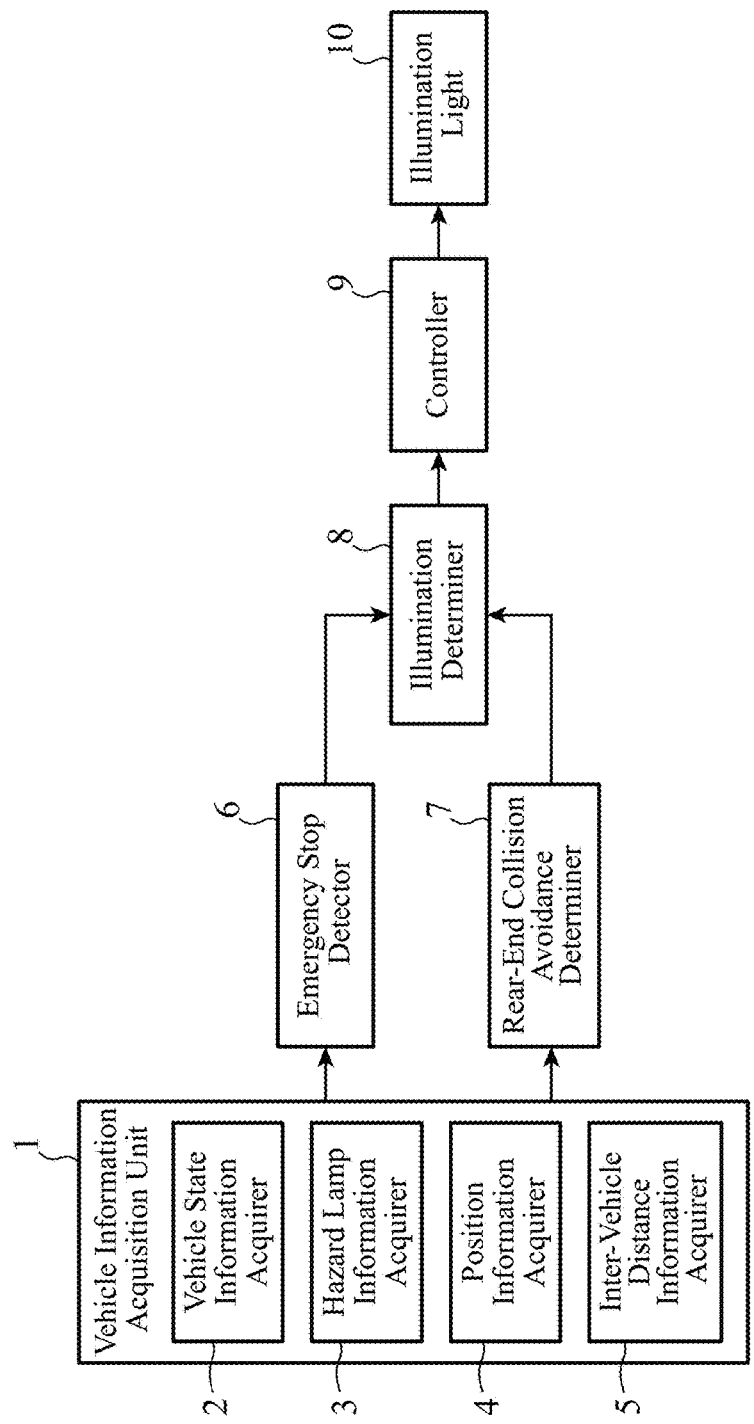
FIG. 1 is a block diagram showing the configuration of a rear-road surface illumination apparatus according to a first embodiment of the present invention.

As shown in FIG. 1, a rear-road surface illumination apparatus according to a first embodiment includes a vehicle information acquisition unit 1, an emergency stop detector 6, a rear-end collision avoidance determiner 7, an illumination determiner 8 and a controller 9, and illuminates a road surface with light from an illumination light 10 mounted in a vehicle, thereby attracting the attention of the driver of a following vehicle to a rear-end collision. This rear-road surface illumination apparatus is comprised of a CPU (Central Processing Unit), memory, emergency stop detector and other devices, and the emergency stop detector executes a program to thereby implementing the functions of the vehicle information acquisition unit 1, the emergency stop detector 6, the rear-end collision avoidance determiner 7, the illumination determiner 8 and the controller 9. The illumination light 10 is a projection lamp or a laser mounted in a rear portion of the vehicle, and illuminates a rear road surface with light, to display a graphic or the like.

The vehicle information acquisition unit 1 acquires various pieces of information either from vehicle-mounted equipment via an in-vehicle network, such as a CAN (Controller Area Network), or directly from vehicle-mounted equipment.

A vehicle state information acquirer 2 acquires vehicle state information showing the state of the vehicle from the vehicle (e.g., an electronic control unit), and outputs the vehicle state information to the emergency stop detector 6 and the rear-end collision avoidance determiner 7. The vehicle state information is, for example, information showing that the vehicle has broken down, information showing that the vehicle has decelerated or stopped while traveling, or information showing whether or not a driving operation has been ended.

A hazard lamp information acquirer 3 acquires hazard lamp information showing whether or not the hazard lamps are on from the vehicle, and outputs the hazard lamp information to the emergency stop detector 6 and the rear-end collision avoidance determiner 7.

A position information acquirer 4 acquires position information showing the position of the vehicle and traffic congestion conditions from the vehicle (e.g., a car navigation device), and outputs the position information to the emergency stop detector 6 and the rear-end collision avoidance determiner 7. The position information acquirer 4 also acquires information about the lane along which the vehicle is traveling, information showing the traveling direction based on the motion of the steering wheel of the vehicle, etc. from the vehicle, and includes these pieces of information in the above-mentioned position information and outputs this position information to the emergency stop detector 6 and the rear-end collision avoidance determiner 7.

An inter-vehicle distance information acquirer 5 acquires distance, between vehicles information showing the distance between the vehicle and the following, vehicle from the vehicle (e.g., a distance between vehicles sensor), and outputs the distance between vehicles information to the emergency stop detector 6 and the rear-end collision avoidance determiner 7.

The various pieces of information acquired by the vehicle information acquisition unit 1 are generically referred to as the vehicle information.

When the vehicle has decelerated or stopped, the emergency stop detector 6 detects whether or not the deceleration or stop is intended for an emergency stop on the basis of the vehicle information acquired by the vehicle information acquisition unit 1, and outputs the result of the determination to the illumination determiner 8. For example, when receiving information showing that the hazard lamps have been lit up, together with the information showing the deceleration or stop of the vehicle, from the vehicle information acquisition unit 1, the emergency stop detector 6 detects that the deceleration or stop is intended for an emergency stop. In contrast, when receiving only the information showing the deceleration or stop of the vehicle, but not receiving the information showing that the hazard lamps have been lit up, the emergency stop detector detects that the deceleration or stop is not intended for an emergency stop.

The rear-end collision avoidance determiner 7 determines whether the vehicle has avoided a rear-end collision of the following vehicle on the basis of the vehicle information acquired by the vehicle information acquisition unit 1, and outputs the result of the determination to the illumination determiner 8. For example, when the hazard lamps of the vehicle are off, or when the following vehicle has stopped and has not approached the vehicle, the rear-end collision avoidance determiner 7 determines that the vehicle has avoided a rear-end collision of the following vehicle.

The illumination determiner 8 determines whether or not to illuminate a road surface behind the vehicle with a display to attract the attention of the driver of the following vehicle for prevention of a rear-end collision, on the basis of the result of the determination performed by the emergency stop detector 6 and the result of the determination performed by the rear-end collision avoidance determiner 7, and outputs the result of the determination performed thereby to the controller 9. For example, when the emergency stop detector 6 detects that the deceleration or stop is intended for an emergency stop, the illumination determiner 8 determines that the rear-road surface illumination apparatus illuminates the rear road surface with a display, whereas when the emergency stop detector detects that the deceleration or stop is not intended for an emergency stop, the illumination determiner determines that the rear-road surface illumination apparatus does not illuminate the rear road surface with any display. As a result, the rear-road surface illumination apparatus does not perform an illumination operation at all times, but can illuminate the rear road surface with a display at an appropriate timing.

The controller 9 controls illumination information at the time that the illumination light 10 illuminates the rear road surface with a display having the illumination information, in accordance with the result of the determination performed by the illumination determiner 8. The illumination information intended for attraction of the attention of the driver of the following vehicle to a rear-end collision is, for example, a graphic for inducing the following vehicle to decelerate or stop by using such an illusion as shown in FIGS. 2A to 2C.

Figure 2A:
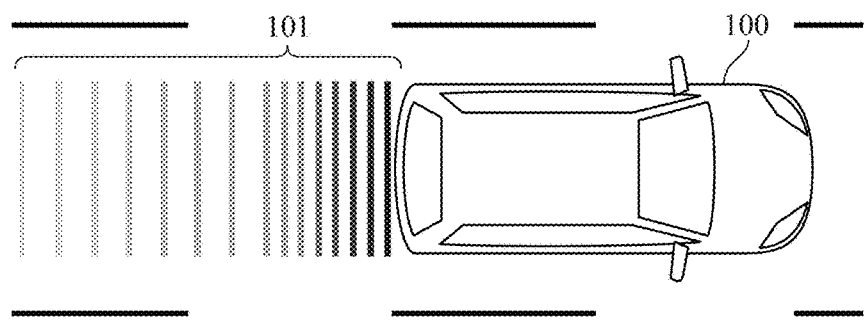
FIGS. 2A to 2C are diagrams showing an example of a deceleration stop request display with which a road surface is illuminated by the rear-road surface illumination apparatus according to the first embodiment.

For example, when producing a deceleration stop request display 101 as shown in FIG. 2A, the gap between lines with which the road surface is illuminated increases and the display color varies with distance in a backward direction from the rear of the vehicle 100. Although in FIG. 2A the deceleration stop request display 101 is expressed by gradations in monochrome, the lines are actually colored and their colors vary in such a way that the colors of lines in the vicinity of the vehicle 100 are red, and their colors vary to orange with distance in a backward direction from the rear of the vehicle. Further, when producing a deceleration stop request display 101 as shown in FIG. 2B, the lines increase in thickness with distance in a backward direction from the rear of the vehicle 100, and the shapes of the lines vary from straight to arrow. FIG. 2C is a diagram showing an example of how the deceleration stop request display 101 with which the rear road surface is illuminated by the vehicle 100 is viewed from the following vehicle.

Figure 2B:
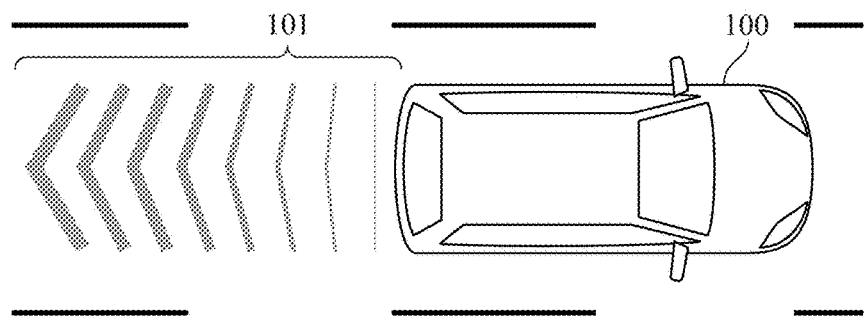
Figure 2C:
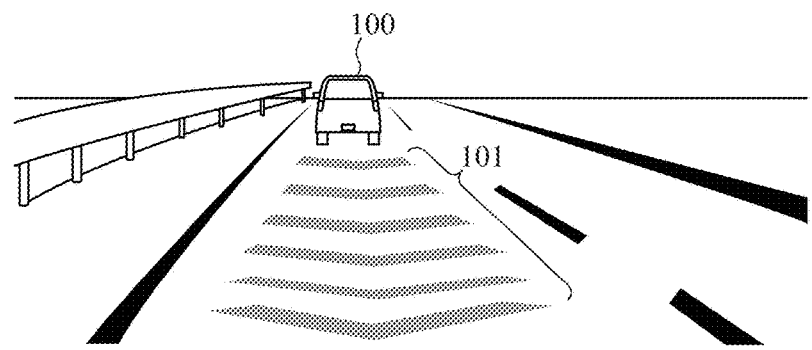

Because the rear-road surface illumination apparatus can cause the driver of the following vehicle to sense that the distance to the preceding vehicle (i.e., the vehicle 100) becomes short without having a sense of danger, by illuminating the rear road surface with the deceleration stop request display, as shown in FIGS. 2A to 2C, to induce the driver of the following vehicle to decelerate or stop the following vehicle by using an illusion, the rear-road surface illumination apparatus can induce the driver of the following vehicle to decelerate or stop the following vehicle.

For reference purposes, there has been provided a research result showing that an effect of causing the driver to reduce the driving speed is produced by an illusion resulting from painting of walls with colors (Yukio Adachi and five others, "Experimental Study on Speed Reduction Effect by Sequence Design", Japan Society of Civil Engineers Collected Papers D, 2010, Vol. 66, No. 1, pp. 27-39).

Further, although details are explained by using FIGS. 9 to 12, when the distance between the vehicle 100 and the following vehicle is short, variations using an animation, such as blinking of the deceleration stop request display 101 at a high speed or changing of the color of the deceleration stop request display, can be added. As a result, the rear-road surface illumination apparatus makes it easy for the driver of the following vehicle to notice the vehicle 100 standing ahead of the following vehicle.

The illumination light 10 receives the illumination information for attraction of attention to a rear-end collision (e.g., information about a deceleration stop request display) from the controller 9, and illuminates the road surface with a display reflecting the illumination information. The illumination means is a projection, lamp, a laser, or the like, as mentioned above.

Next, the operation of the rear-road surface illumination apparatus will be explained using a flow chart shown in FIG. 3.

Step ST100 is a process of detecting either deceleration or a stop of the vehicle.

The emergency stop detector 6 acquires the vehicle state information from the vehicle state information acquirer 2 of the vehicle information acquisition unit 1, and detects either deceleration or a stop of the vehicle.

Step ST101 is a process of determining whether or not the hazard lamps have been lit up.

The emergency stop detector 6 acquires the hazard lamp information from the hazard lamp information acquirer 3 of the vehicle information acquisition unit 1, and detects whether or not the deceleration or stop of the vehicle which is detected in step ST100 is intended for an emergency stop. When the hazard lamps are on (when "YES" in step ST101), the emergency stop detector 6 detects that the deceleration or stop is intended for an emergency stop and advances to step ST103. In contrast, when the hazard lamps are off (when "NO" in step ST101), the emergency stop detector 6 detects that the deceleration or stop is not intended for an emergency stop and advances to step ST102.

The vehicle may be equipped with a system, such as an emergency signal system, that automatically performs high-speed blinking of the hazard lamps or the stop lamps in response to quick braking of the vehicle, depending upon the type of the vehicle. In this case, the emergency stop detector 6 can detect that the vehicle has made an emergency stop, on the basis of information showing that the emergency signal system has been activated.

Step ST102 is a process of determining whether or not the deceleration or stop of the vehicle results from quick braking.

When the vehicle has decelerated or stopped, but the hazard lamps are turned off, the emergency stop detector 6 detects whether the deceleration or stop of the vehicle, which is detected in step ST100, results from quick braking on the basis of the vehicle state information acquired from the vehicle state information acquirer 2 of the vehicle information acquisition unit 1. Quick braking means that the driver steps on the brake pedal strongly in order to avoid some kind of danger, such as person running into the street ahead of the vehicle traveling, and, as a result, the vehicle decelerates or stops quickly. By determining whether or not such quick braking is performed, the emergency stop detector 6 detects whether or not the deceleration or stop of the vehicle is intended for an emergency stop. When the vehicle performs quick braking (when "YES" in step ST102), the emergency stop detector 6 detects that the deceleration or stop of the vehicle is intended for an emergency stop and advances to step ST103. In contrast, when the vehicle does not perform quick braking (when "NO" in step ST102), the emergency stop detector 6 detects that the deceleration or stop of the vehicle is not intended for an emergency stop, and advances to step ST104.

Step ST103 is a process of illuminating the read road surface with a deceleration stop request display.

When the emergency stop detector 6 detects that the deceleration or stop of the vehicle is intended for an emergency stop (when "YES" in step ST101 or when "YES" in step ST102), or when the rear-end collision avoidance determiner 7, which will be described later, determines that the following vehicle has not avoided a rear-end collision (when "NO" in step ST106), the illumination determiner 8 instructs the controller 9 to illuminate the rear road surface with a display intended for prevention of a rear-end collision of the following vehicle and for attraction of attention to a rear-end collision. The controller 9 controls the illumination light 10 so as to cause the illumination light to illuminate the rear road surface with a deceleration stop request display as shown in FIGS. 2A to 2C.

As a result, means for notifying the following vehicle that the vehicle has decelerated or stopped increase in number, so that the rear-road surface illumination apparatus makes it easy for the driver of the following vehicle to notice that the preceding vehicle has decelerated or stopped.

Step ST104 is a process of determining whether or not a following vehicle is traveling behind the vehicle.

When detecting that a following vehicle is traveling behind the vehicle, the distance between vehicles sensor outputs information about the distance from the vehicle to the following vehicle, whereas when there is no following vehicle traveling behind the vehicle, the distance between vehicles sensor cannot detect any following vehicle and output information showing that the distance between vehicles is unknown. The inter-vehicle distance information acquirer 5 of the vehicle information acquisition unit 1 acquires the above-mentioned information from the distance between vehicles sensor, and outputs the information to the rear-end collision, avoidance determiner 7.

The rear-end collision avoidance determiner 7 acquires the distance between vehicles information from the inter-vehicle distance information acquirer 5 of the vehicle information acquisition unit 1, and determines whether or not a following vehicle is traveling behind the vehicle. When receiving the distance between vehicles information from the inter-vehicle distance information acquirer 5 (when "YES" in step ST104), the rear-end collision avoidance determiner 7 determines that a following vehicle is traveling behind the vehicle and advances to step ST105. In contrast, when receiving the information showing that the distance between vehicles is unknown from the inter-vehicle distance information acquirer 5 (when "NO" in step ST104), the rear-end collision avoidance determiner 7 determines that there is no following vehicle traveling behind the vehicle, and advances to step ST107.

Step ST105 is a process of determining whether or not the following vehicle is stationary.

The distance between vehicles sensor outputs information showing whether or not there is a change in the distance from the vehicle to the following vehicle, and the inter-vehicle distance information acquirer 5 of the vehicle information acquisition unit 1 acquires this information and outputs the information to the rear-end collision avoidance determiner 7.

When determining, on the basis of the distance between vehicles information received from the inter-vehicle distance information acquirer 5, that the distance between the vehicles has become short because the following vehicle has been approaching the vehicle (when "NO" in step ST105), the rear-end collision avoidance determiner 7 determines that the following vehicle has not avoided a rear-end collision with the vehicle, and advances to step ST106. In contrast, when there is no change in the distance between the vehicles because the following vehicle is stationary (or when the vehicle decelerates and the distance between the vehicles becomes long) (when "YES" in step ST105), the rear-end collision avoidance determiner 7 determines that the following vehicle has avoided a rear-end collision with the vehicle, and advances to step ST107.

Step ST106 is a process of determining whether the following vehicle has moved to another lane.

The position information acquirer 4 of the vehicle information acquisition unit 1 acquires, the position information from the Global Positioning System (GPS) sensor or the like of the vehicle, and also acquires the position information from the GPS sensor or the like of the following vehicle. The rear-end collision avoidance determiner 7 determines whether the following vehicle has moved to a lane different from the lane along which the vehicle is traveling from a correlation between the position information about the vehicle and the position information about the following vehicle. The rear-end collision avoidance determiner 7 determines that the following vehicle has made a lane change when the following vehicle exists in a slanting direction with respect to the rear of the vehicle (when "YES" in step ST106), whereas the rear-end collision avoidance determiner determines that the following vehicle has not made lane change when the following vehicle exists behind the vehicle (when "No" in step ST106.

As an alternative, the rear-end collision avoidance determiner 7 can determine whether the following vehicle has made a lane change by comparing the distance between the vehicle and the following vehicle with the distance between the vehicles detected in step ST104, and determining whether or not the difference between the distances between the vehicles is large. When the distance between the vehicles detected in step ST106 is greater than the distance between the vehicles detected in step ST104, the rear-end collision avoidance determiner 7 determines that the following vehicle has made a lane change (when "YES" in step ST106), whereas when the distance between the vehicles in step ST106 is less than or equal to the distance between the vehicles detected in step ST104, the rear-end collision avoidance determiner 7 determines that the following vehicle has not made a lane change (when "NO" in step ST106).

When determining, through the above-mentioned process, that the lane along which the vehicle is traveling is the same as the lane along which the following vehicle is traveling (when "NO" in step ST106), the rear-end collision avoidance determiner 7 determines that the following vehicle has not avoided a rear-end collision with the vehicle, and returns to step ST103. In contrast, when determining that the following vehicle has moved to a lane different from the lane along which the vehicle is traveling because the following vehicle has made a lane change or a right or left turn (when "YES" in step ST106), the rear-end collision avoidance determiner 7 determines that the following vehicle has avoided a rear-end collision with the vehicle, and advances to step ST107.

Step ST107 is a process of stopping the illumination of a deceleration stop request display.

When the rear-end collision avoidance determiner 7 determines that the following vehicle has avoided a rear-end collision with the vehicle (when "NO" in step ST104, when "YES" in step ST105, or when "YES" in step ST106), the illumination determiner 8 instructs the controller 9 to stop illuminating the rear road surface with the deceleration stop request display. The controller 9 controls the illumination light 10 to stop the operation of illuminating the rear road surface with the deceleration stop request display.

Step ST108 is a process of determining whether the driver has ended the driving operation.

The emergency stop detector 6 acquires the vehicle state information from the vehicle state information acquirer 2 of the vehicle information acquisition unit 1, and detects whether the driver has ended the driving operation such as whether the driver has performed an operation of turning off the engine. When determining that the driver has ended the driving operation (when "YES" in step ST108), the rear-road surface illumination apparatus ends its operation. In contrast, when determining that the driver continues driving (when "NO" in step ST108), the rear-road surface illumination apparatus returns to step ST101.

The flow chart shown in FIG. 3 is an example, and the operation of the rear-road surface illumination apparatus is not limited to this example. For example, the rear-end collision avoidance determiner 7 can be eliminated in the rear-road surface illumination apparatus, and steps ST104 to ST107 can be eliminated in the flow chart shown in FIG. 3.

As mentioned above, the rear-road surface illumination apparatus according to the first embodiment has a configuration which includes the vehicle information acquisition unit 1 configured to acquire the vehicle information from the vehicle-mounted equipment mounted in the vehicle, the emergency stop detector 6 configured to detect either an emergency stop of the vehicle or deceleration of the vehicle intended for an emergency stop on the basis of the vehicle information acquired by the vehicle information acquisition unit 1, and the controller 9 configured to cause the illumination light 10 to illuminate a rear road surface with light having illumination information expressing attraction of attention to a rear-end collision when the emergency stop detector 6 detects either an emergency stop or deceleration intended for an emergency stop. This configuration makes it possible to indicate the existence of the vehicle which has made an emergency stop or decelerated for the purpose of an emergency stop to the following vehicle, to give the existence of the vehicle prominence, and also making it easy to notify the driver of the following vehicle about what the driver of the vehicle desires the driver of the following vehicle to do. Further, because the configuration does not necessarily illuminate the rear road surface with light whenever the vehicle decelerates or stops, the rear-road surface illumination apparatus can prevent itself from continuing illuminating the rear road surface with light, thereby being able to prevent the occurrence of a confusion in the surroundings. In addition, by illuminating the rear road surface with light expressing a graphic other than characters, the rear-road surface illumination apparatus makes it possible for the driver of the following vehicle to intuitively understand the meaning of the graphic without having to decipher the graphic.

Further, the rear-road surface illumination apparatus according to the first embodiment includes the rear-end collision avoidance determiner 7 configured to determine whether the following vehicle has avoided a rear-end collision with the vehicle on the basis of the vehicle information acquired by the vehicle information acquisition unit 1, and the controller 9 is configured to, when the rear-end collision avoidance determiner 7 determines that the following vehicle has not avoided a rear-end collision with the vehicle, cause the illumination light 10 to illuminate the rear road surface with light (a deceleration stop request display) having the illumination information which is intended to induce the following vehicle to decelerate or stop, and indicates a display pattern that varies with distance in a backward direction from the rear of the vehicle. The rear-road surface illumination apparatus displays the illumination information using an illusion on the road surface, thereby making it possible for the driver of the following vehicle to spontaneously decelerate or stop the following vehicle without feeling that the driver is forced to do that, and avoid a rear-end collision with the vehicle.

Further, although signs and so on have been provided conventionally as a method of attracting the attention of the drivers of vehicles, there has been provided a method of painting a road surface and the inside of a tunnel, instead of signs, because it is not realistic to dispose signs in a central lane on a street having three or more lanes. However, restrictions about the location where a road surface or the like is painted are imposed on the method of attracting attention by using painting, and the descriptions of attraction of attention cannot be changed as appropriate because the method uses painting. In contrast with this, because the rear-road surface illumination apparatus according to the first embodiment can be applied to any situation as long as there are vehicles and a road surface, the restrictions about the location can be eliminated, and the rear-road surface illumination apparatus can attract the attention of the driver of a following vehicle at any time and can perform illumination corresponding to the use of the rear-road surface illumination apparatus.

Second Embodiment

Figure 4:
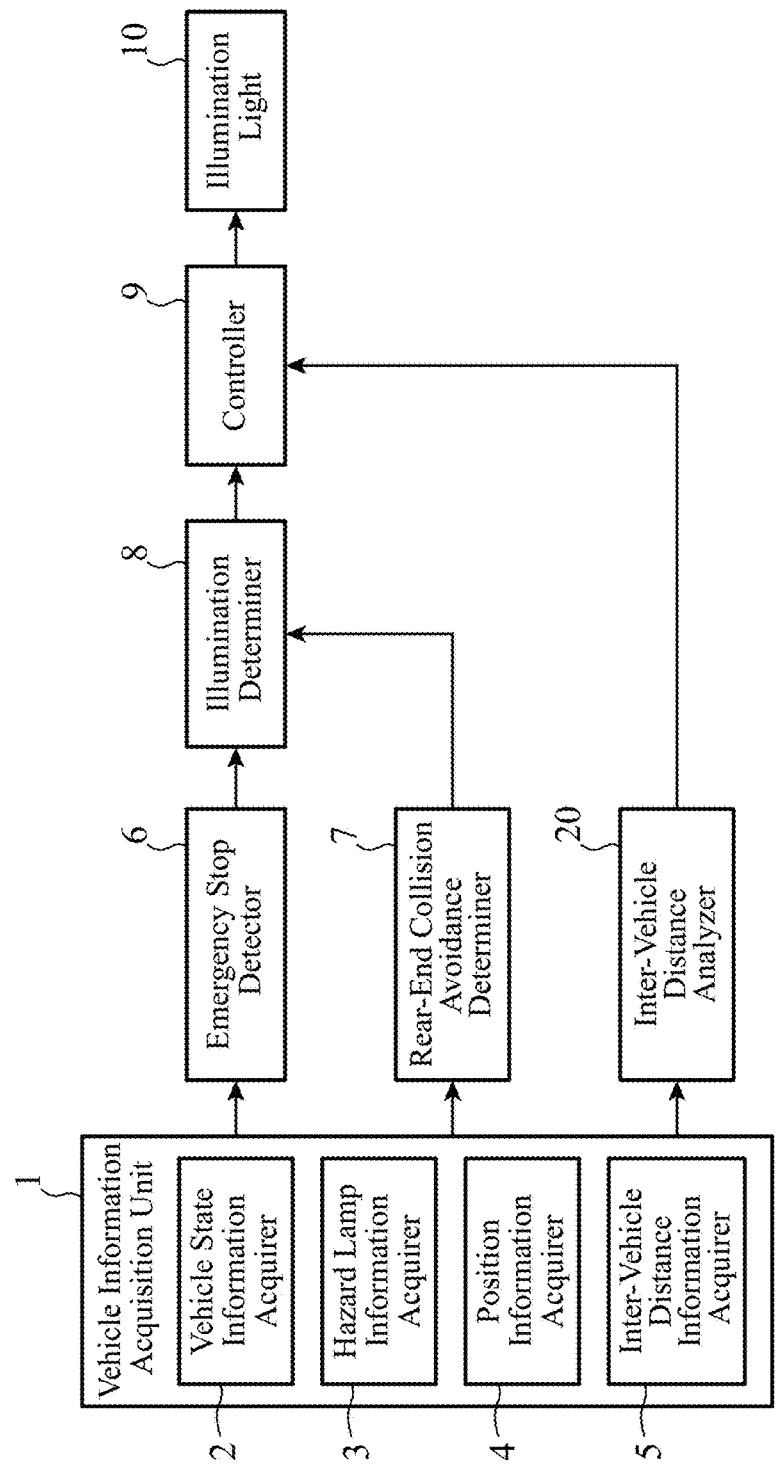
FIG. 4 is a block diagram showing the configuration of a rear-road surface illumination apparatus according to a second embodiment of the present invention.

FIG. 4 is a block diagram showing an example of the configuration of a rear-road surface illumination apparatus according to the second embodiment. In FIG. 4, the same components as those of FIG. 1 or like components are designated by the same reference numerals, and the explanation of the components will be omitted hereafter. The rear-road surface illumination apparatus according to the second embodiment is configured so as to additionally include an inter-vehicle distance analyzer 20.

A vehicle information acquisition unit 1 outputs vehicle information also to the inter-vehicle distance analyzer 20, as well as to an emergency stop detector 6 and a rear-end collision avoidance determiner 7.

The inter-vehicle distance analyzer 20 determines what kind of distance relationship exists between the vehicle equipped with the rear-road surface illumination apparatus and a following vehicle on the basis of the information acquired from the vehicle information acquisition unit 1, and determines illumination information corresponding to the distance relationship on the basis of the result of the above determination to instruct a controller 9 to use the illumination information.

For example, when sensing on the basis of hazard lamp information that only several seconds or less have elapsed since the hazard lamps have started lighting, the inter-vehicle distance analyzer 20 determines that the vehicle is at a point having a distance A, regardless of a vehicle state and the distance between the vehicles. The inter-vehicle distance analyzer 20 determines illumination information A1 corresponding to the distance A, and outputs an instruction to illuminate a rear road surface with light having the illumination information A1 to the controller 9.

When receiving the determination result showing that a road surface is to be illuminated with a deceleration stop request display from an illumination determiner 8, the controller 9 controls an illumination light 10 according to the illumination information instructed from the inter-vehicle distance analyzer 20.

Next, the operation of the rear-road surface illumination apparatus according to the second embodiment will be explained with reference to FIGS. 5 to 8.

FIG. 5 is a flow chart showing the operation of the rear-road surface illumination apparatus according to the second embodiment. Because processes in steps ST100 to ST103, ST107 and ST103 shown in FIG. 5 are the same as those shown in FIG. 3, the explanation of the processes will be omitted hereafter. FIGS. 6A to 6E are diagrams showing distances A to E at which the vehicle 100 exist, respectively. FIG. 7 is a table showing determination criteria for the distances A to E. FIGS. 8A to 8G are diagrams showing examples of a road surface display having pieces of illumination information A1 to D1 corresponding to the distances A to E.

When the emergency stop detector 6 detects that deceleration or a stop of the vehicle is intended for an emergency stop (when "YES" in step ST101 or when "YES" in step ST102), or when the inter-vehicle distance analyzer 20, which will be described later, determines that the vehicle is not at the distance E (when "NO" in step ST208), the illumination determiner 8 instructs the controller 9 to illuminate a rear road surface with a deceleration stop request, display (in step ST103). At that time, the illumination determiner, in the following steps ST200 to ST207, determines what kind of illumination information is to be used to produce the deceleration stop request display with which to illuminate the rear road surface.

Step ST200 is a process of determining whether or not the vehicle is at a point having the distance A.

The inter-vehicle distance analyzer 20 acquires hazard lamp information from a hazard lamp information acquirer 3 of the vehicle information acquisition unit 1, and also acquires vehicle state information from a vehicle state information acquirer 2, and, when sensing that the hazard lamps have started lighting or when sensing that the vehicle has started quick braking, determines that the vehicle is at a point having the distance A. At this time, the inter-vehicle distance analyzer 20 does not take into consideration both the existence or non-existence of a following vehicle and the distance between the vehicle and the following vehicle.

Not only when sensing that the hazard lamps have started lighting, but also when sensing that several seconds or less have elapsed since the hazard lamps have started lighting, the inter-vehicle distance analyzer can determine that the vehicle is at a point having the distance A. Further, not only when sensing that the vehicle has started quick braking, but also when sensing that several seconds or less have elapsed since the vehicle has started quick braking, the inter-vehicle distance analyzer can determine that the vehicle is at a point having the distance A.

The inter-vehicle distance analyzer 20 holds the pieces of illumination information A1 to D1 corresponding to the distances A to D, and, when determining that the vehicle is at a point having the distance A (when "YES" in step ST200), selects the illumination information A1 corresponding to the distance A and instructs the controller 9 to use the illumination information A1, and advances to step ST201. In contrast, when determining that the vehicle is not at a point having the distance A (when "NO" in step ST200), the inter-vehicle distance analyzer 20 advances to step ST202.

Figure 6A:
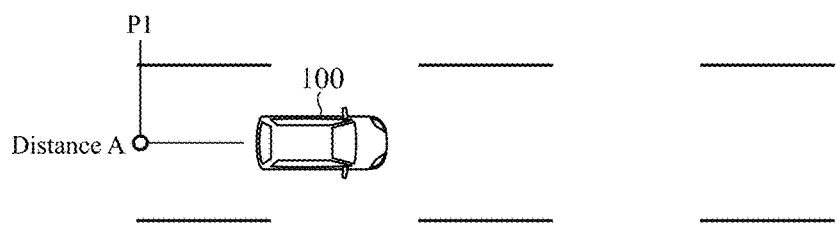
FIGS. 6A to 6E are diagrams showing distances A to E at each of which a vehicle is existing.

When it is assumed that either the point where the hazard lamps start lighting or the point where the vehicle starts quick braking is defined as a reference point P1, as shown in FIG. 6A, the distance A is the one which the vehicle 100 can reach in several seconds from the reference point P1.

Although in this example, after, in step ST100, sensing deceleration or a stop of the vehicle, the inter-vehicle distance analyzer determines that the vehicle position is at the distance A when sensing either lighting of the hazard lamps or quick braking, this embodiment is not limited to this example. The inter-vehicle distance analyzer can be alternatively configured so as to determine that the vehicle position is at the distance A when sensing either lighting of the hazard lamps or quick braking while the vehicle is traveling under normal conditions.

Step ST201 is a process of illuminating the road surface with light having the illumination information A1 when the vehicle is at a point having the distance A.

The controller 9 controls the illumination light 10 according to the illumination information A1 instructed from the inter-vehicle distance analyzer 20, to cause the illumination light to illuminate the rear road surface behind the vehicle with a deceleration stop request display having the illumination information A1. When the vehicle is at a point having the distance A, in order to implicitly notifying the surroundings of the vehicle that the vehicle has started decelerating, the controller gradually changes the deceleration stop request display from the one having the illumination information A1 to the one having the illumination information B1 as the vehicle travels.

According to the illumination information A1, the illumination light illuminates the rear road surface with the deceleration stop request display 101 in such a way that, for example, the displaying volume of the deceleration stop request display increases gradually in the order of those shown in FIGS. 8A, 8B and 8C. By the way, in the example shown in FIG. 8A, the vehicle is in a state in which the illumination light does not illuminate the rear road surface with the deceleration stop request display 101, and only the hazard lamps are on.

Because the rear-road surface illumination apparatus has started producing the display implicitly notifying deceleration since the vehicle has started decelerating, the rear-road surface illumination apparatus can implicitly notify the following vehicle at an earlier time that the vehicle is about to decelerate or stop.

Step ST202 is a process of determining whether or not the vehicle is at a point having the distance B.

The inter-vehicle distance analyzer 20 acquires the hazard lamp information from the hazard lamp information acquirer 3 of the vehicle information acquisition unit 1 and also acquires the vehicle state information from the vehicle state information acquirer 2, and, when it is sensed that the hazard lamps are on and it is also sensed that the vehicle has started decelerating or is decelerating, determines that the vehicle is at a point having the distance B. At this time, the inter-vehicle distance analyzer 20 does not take into consideration both the existence or non-existence of a following vehicle and the distance between the vehicle and the following vehicle. When determining that the vehicle is at a point having the distance B (when "YES" in step ST202), the inter-vehicle distance analyzer 20 selects the illumination information B1 corresponding to the distance B and instructs the controller 9 to use the illumination information (in step ST203), and advances to step ST204. In contrast, when determining that the vehicle is not at a point having the distance B (when "NO" in step ST202), the inter-vehicle distance analyzer 20 advances to step ST204.

Figure 6B:
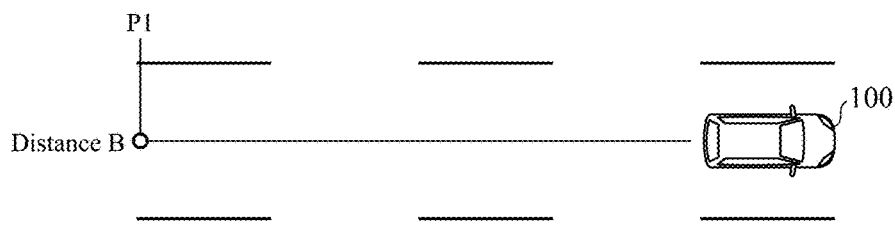

A point having the distance B is shown in FIG. 6B.

Step ST203 is a process of illuminating the rear road surface with light having the illumination information B1 when the vehicle is at a point having the distance B.

The controller 9 controls the illumination light 10 according to the illumination information B1 instructed from the inter-vehicle distance analyzer 20, to cause the illumination light to illuminate the rear road surface behind the vehicle with a deceleration stop request display having the illumination information B1. When the vehicle 100 is at a point having the distance B, the illumination light illuminates the rear road surface behind the vehicle with the deceleration stop request display extending up to the reference point P1, in order to implicitly notify the following vehicle 200 about how long the distance between, the vehicle 100 and the following vehicle 200 is, as shown in FIG. 8D.

As a result, the rear-road, surface illumination apparatus can impress the driver of the following vehicle 200 with a change from the illumination information B1 to the illumination information C1 and then to the illumination information D1 (which will be described later). Further, as the illumination information B1, there is provided illumination information expressing that, in order to implicitly show the distance between the vehicles, the gap between lines increases, the lines increase in thickness, or their display colors are brightened in the deceleration stop request display 101 with distance from the rear of the vehicle 100. As a result, the rear-road surface illumination apparatus enables the driver of the following vehicle 200 to hold a feeling of distance with the preceding vehicle by simply looking at the display on the road surface.

Step ST204 is a process of determining whether or not the vehicle is at a point having the distance C.

The inter-vehicle distance analyzer 20 acquires the hazard lamp information from the hazard lamp information acquirer 3 of the vehicle information acquisition unit 1, the vehicle state information from the vehicle state information acquirer 2, and distance between vehicles information from a inter-vehicle distance information acquirer 5. When sensing that the hazard lamps are turned on, sensing that the vehicle is either decelerating or stationary, and sensing that the following vehicle is approaching the vehicle, on the basis of these pieces of information, the inter-vehicle distance analyzer 20 determines that the vehicle is at a point having the distance C. A state in which the following vehicle is approaching the vehicle at the time of determining whether or not the vehicle is at a point having the distance C is, for example, one in which the distance between the vehicle and the following vehicle is longer than or equal to 5 meters, but is gradually decreasing. When determining that the vehicle is at a point having the distance C (when "YES" in step ST204), the inter-vehicle distance analyzer 20 selects the illumination information C1 corresponding to the distance C and instructs the controller 9 to use the illumination information (in step ST205), and advances to step ST206. In contrast, when determining that the vehicle is not at a point having the distance C (when "NO" in step ST204), the inter-vehicle distance analyzer 20 advances to step ST206.

Figure 6C:
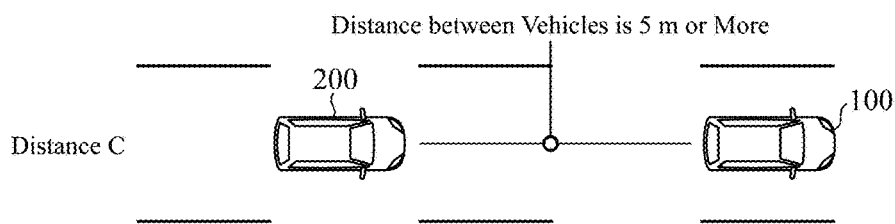

A point having the distance C is shown in FIG. 6C.

Step ST205 is a process of illuminating the rear road surface with light having the illumination information C1 when the vehicle is at a point having the distance C.

The controller 9 controls the illumination light 10 according to the illumination information C1 instructed from the inter-vehicle distance analyzer 20, and causes the illumination light to illuminate the rear road surface behind the vehicle with the deceleration stop request display having the illumination information C1. When the vehicle 100 is at a point having the distance C, the controller causes the illumination light to illuminate a range extending from the vehicle 100 to a front end of the following vehicle 200 with the deceleration stop request display 101, and gradually narrow the range illuminated with the deceleration stop request display 101 according to the distance between the vehicle 100 and the following vehicle 200, on the basis of the distance between vehicles information, as shown in FIG. 8E. The distance between vehicles information is notified from, for example, the inter-vehicle distance information acquirer 5 of the vehicle information acquisition unit 1 to the controller 9 via the inter-vehicle distance analyzer 20.

As a result, the driver of the following vehicle 200 can be notified implicitly that the distance between the vehicle 100 and the following vehicle 200 is gradually getting narrower. Further, in order to impress the driver of the following vehicle 200 with a change from the illumination information C1 to the illumination information D1 at this time, the controller can narrow the gap between lines, change their display colors gradually (e.g., change their display colors from orange to red), or blink the lines, in the deceleration stop request display 101 with which the rear road surface is illuminated. As a result, the controller can further enhance the deceleration stop request display 101.

Step ST206 is a process of determining whether or not the vehicle is at a point having the distance D.

The inter-vehicle distance analyzer 20 acquires the hazard lamp information from the hazard lamp information acquirer 3 of the vehicle information acquisition unit 1, the vehicle state information from the vehicle state information acquirer 2, and the distance between vehicles information from the inter-vehicle distance information acquirer 5. When sensing that the hazard lamps are on, sensing that the vehicle is stationary, and sensing that the following vehicle is approaching the vehicle, on the basis of these pieces of information, the inter-vehicle distance analyzer 20 determines that the vehicle is at a point having the distance D. A state in which the following vehicle is approaching the vehicle at the time of determining whether or not the vehicle is at a point having the distance D is, for example, one in which the distance between the vehicle and the following vehicle is shorter than 5 m, and is gradually getting narrower. When determining that the vehicle is at a point having the distance D (when "YES" in step ST206), the inter-vehicle distance analyzer 20 selects the illumination information D1 corresponding to the distance D and instructs the controller 9 to use the illumination information (in step ST207), and advances to step ST208. In contrast, when determining that the vehicle is not at a point having the distance D (when "NO" in step ST206), the inter-vehicle distance analyzer 20 advances to step ST208.

Figure 6D:
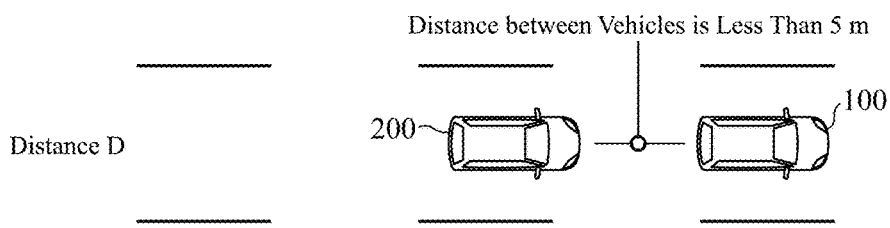

A point having the distance D is shown in FIG. 6D.

Step ST207 is a process of illuminating the rear road surface with light having the illumination information D1 when the vehicle is at a point having the distance D.

The controller 9 controls the illumination light 10 according to the illumination information D1 instructed from the inter-vehicle distance analyzer 20, and causes the illumination light to illuminate the rear road surface behind the vehicle with the deceleration stop request display having the illumination information D1. When the vehicle 100 is at rest at a point having the distance D, the controller causes the illumination light to illuminate a range extending from the vehicle 100 to the front end of the following vehicle 200 with the deceleration stop request display 101, as shown in FIG. 8F. At this time, for example, the controller sets all the display colors of the lines in the deceleration stop request display 101 to red, and widens the illuminated region to the right and the left as viewed from the following vehicle 200. In the example shown in FIG. 8F, the deceleration stop request display 101 is widened to the right and the left while extending outside the lane across the traffic lane lines. As an alternative, the deceleration stop request display 101 can be blinked at a speed higher than the blink speed of the hazard lamps.

As a result, the driver of the following vehicle 200 can be notified implicitly that the distance between the vehicle 100 and the following vehicle 200 has been shortened to its limit, and the driver must stop the following vehicle without approaching any more.

Step ST208 is a process of determining whether or not the vehicle is at a point having the distance E.

The inter-vehicle distance analyzer 20 acquires the hazard lamp information from the hazard lamp information acquirer 3 of the vehicle information acquisition unit 1, the vehicle state information from the vehicle state information acquirer 2, and the distance between vehicles information from the inter-vehicle distance information acquirer 5. When sensing that the hazard lamps are off, sensing that the vehicle is stationary or has started traveling, and sensing that the following vehicle is stationary, on the basis of these pieces of information, the inter-vehicle distance analyzer 20 determines that, the vehicle is at a point having the distance E. When determining that the vehicle is sit a point having the distance E (when "YES" in step ST208), the inter-vehicle distance analyzer 20 advances to step ST107. In contrast, when determining that the vehicle is not at a point having the distance E (when "NO" in step ST208), the inter-vehicle distance analyzer 20 returns to step ST103.

Figure 6E:
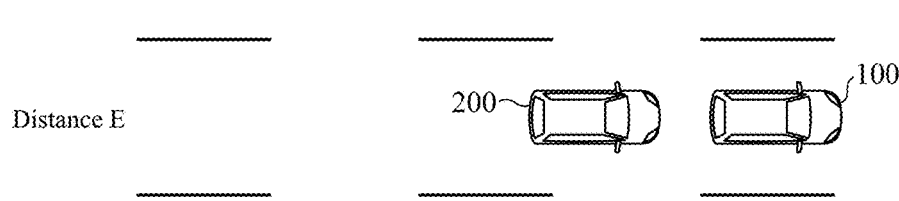

A point having the distance E is shown in FIG. 6E. Further, when the vehicle 100 is at a point having the distance E, the rear-road surface illumination apparatus does not illuminate the rear road surface with the deceleration stop request display 101, as shown in FIG. 8G (in step ST107).

The flow chart shown in FIG. 5 is an example, and the operation of the rear-road surface illumination apparatus is not limited to this example.

Hereafter, variants of the pieces of illumination information A1 to D1 will be explained.

Figure 9A:
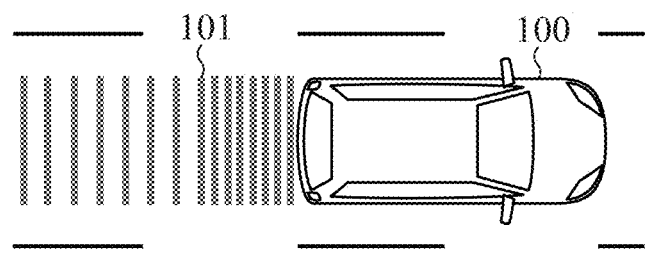
FIGS. 9A and 9B are diagrams showing variants of the deceleration stop request displays having the pieces of illumination information A1 to D1, and shows an example of a blinking animation.
Figure 9B:
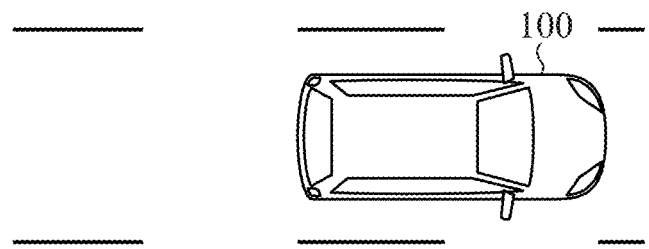
Figure 10A:
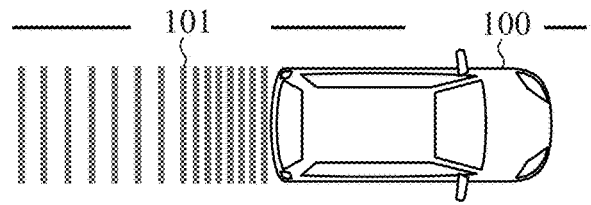
FIGS. 10A to 10E are diagrams showing variants of the deceleration stop request displays having the pieces of illumination information A1 to D1, and shows another example of a blinking animation.
Figure 10B:
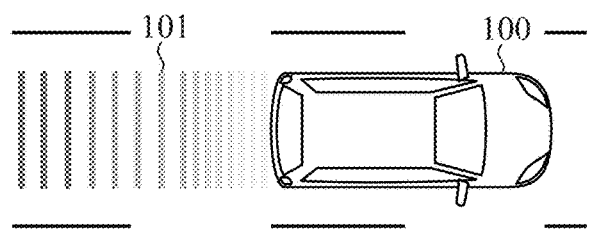
Figure 10C:
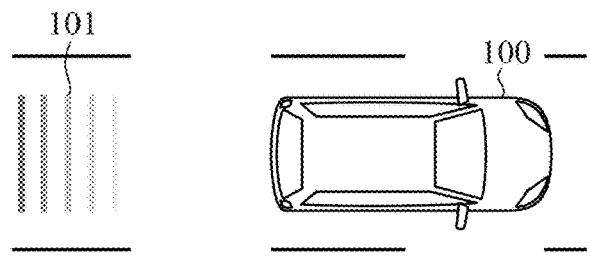
Figure 10D:
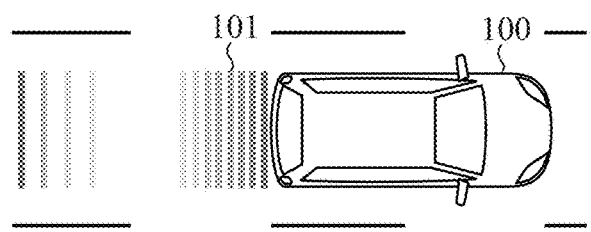
Figure 10E:
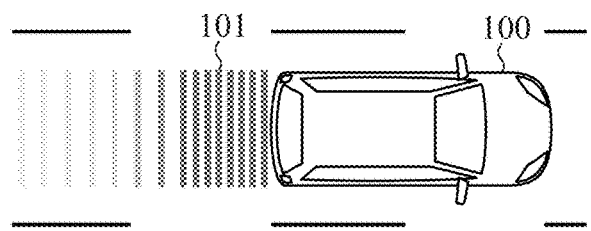
Figure 11A:
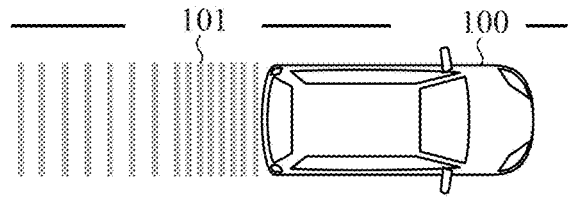
FIGS. 11A and 11B are diagrams showing variants of the deceleration stop request displays having the pieces of illumination information A1 to D1, and shows an example of an animation in which display colors vary.
Figure 11B:
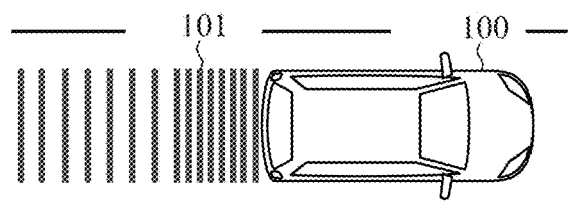

When controlling the illumination light 10 to illuminate the road surface with the deceleration stop request, display 101 having any of the pieces of illumination information A1 to D1, the controller 9 can display, as the deceleration stop request display, a blinking animation by, for example, repeating a fade-in as shown in FIG. 9A and a fade-out as shown in FIG. 9B. By repeating blinking of the deceleration stop request display 101 by using the fact that people tend to pay more attention to moving objects rather than to stationary objects, the rear-road surface illumination apparatus can lead the driver of the following vehicle to notice that the road surface is illuminated with something even if the driver cannot recognize the illumination information with which the road surface is illuminated because the following vehicle is far from the vehicle.

As an alternative, the rear-road surface illumination apparatus can illuminate the road surface with an animation in which the deceleration stop request display 101 changes in such a way that its changing patterns are displayed in the order of those shown in FIG. 10A, FIG. 10B, FIG. 10C, FIG. 10D, and FIG. 10E, and a change having a flow is added to both a range which is illuminated with the deceleration stop request display and another range which is not illuminated with the deceleration stop request display. As a result, the rear-road surface illumination apparatus can implicitly notify the driver of the following vehicle about the direction shown by the deceleration stop request display 101 (i.e., the direction of the vehicle 100).

The rear-road surface illumination apparatus can display the blinking animation only once, or can repeatedly display the blinking animation.

As an alternative, for example, the rear-road surface illumination apparatus can illuminate the road surface with an animation in which the display color of the deceleration stop request display 101 varies. Although the deceleration stop request display 101 is expressed by gradations in monochrome in FIGS. 11A and 11B, the lines are colored actually and their display colors are varied from orange shown in FIG. 11A to red shown in FIG. 11B. As a result, the rear-road surface illumination apparatus can lead the driver of the following vehicle to notice a change in the illumination even if the driver cannot recognize the illumination information with which the road surface is illuminated because the following vehicle is far from the vehicle. Further, by using the fact that people tend to pay more attention to moving objects rather than to stationary objects, the rear-road surface illumination apparatus can lead the driver of the following vehicle to notice that the road surface is illuminated with something.

The device can make a change to the display colors only once, or can repeatedly make a change to the display colors.

Figure 12A:
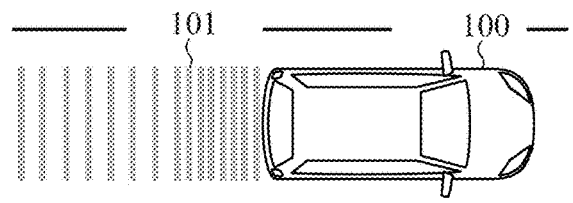
FIGS. 12A to 12C are diagrams showing variants of the deceleration stop request displays having the pieces of illumination information A1 to D1, and shows an example of an animation in which shapes or the likes vary.
Figure 12B:
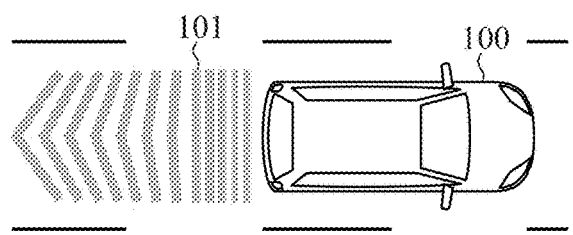
Figure 12C:
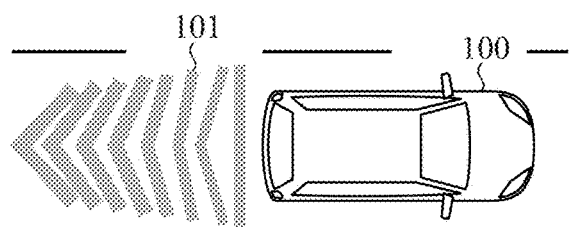

As an alternative, for example, the rear-road surface illumination apparatus can illuminate the road surface with an animation in which lines in the deceleration stop request display 101 shown in FIG. 12A are gradually changed in shape to arrows as shown FIG. 12B and then to arrows as shown in FIG. 12C, the lines are thickened, and the gap between lines is widened. By making a change to the shape and so on of the lines, the rear-road surface illumination apparatus makes it easy to implicitly notify the driver of the following vehicle that the driver is requested to decelerate and stop the following vehicle.

The rear-road surface illumination apparatus can make a change to the shape and so on of the lines only once, or can repeatedly make a change to the shape and so on of the lines.

Figure 13A:
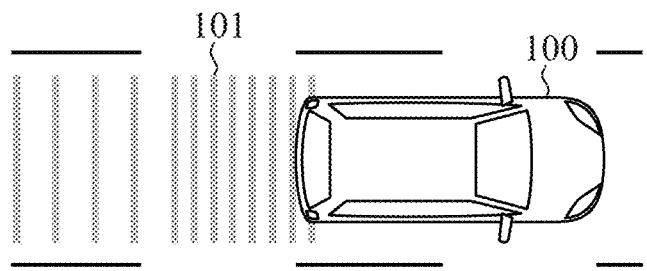
FIGS. 13A to 13C are diagrams showing variants of the deceleration stop request displays having the pieces of illumination information A1 to D1, and shows an example of an animation in which an illumination range or the like varies.
Figure 13B:
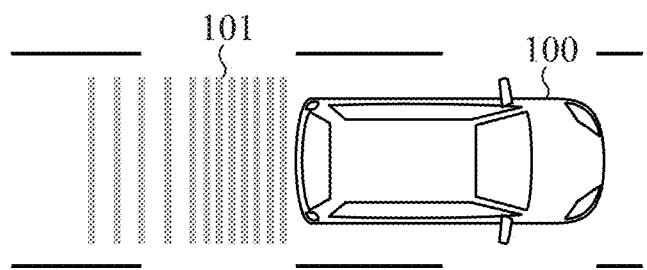
Figure 13C:
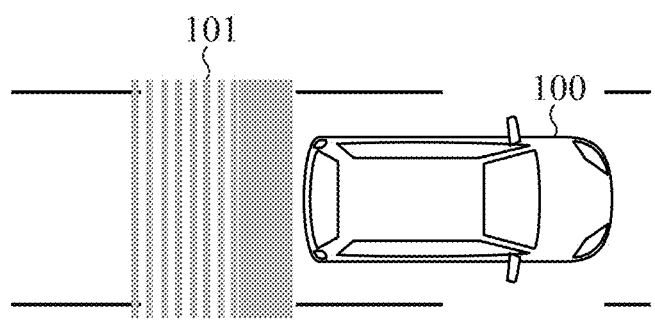

As an alternative, for example, the rear-road surface illumination apparatus can illuminate the road surface with an animation in which the illumination range and the gap between lines of the deceleration, stop request display 101 shown in FIG. 13A are widened laterally and narrowed longitudinally as viewed from the following vehicle, as shown in FIGS. 13B and 13C. For example, the rear-road surface illumination apparatus does not change the illumination range when the vehicle 100 is at a point having the distance B, narrows the illumination range longitudinally as viewed from the following vehicle with decrease in the distance between the vehicle and the following vehicle when the vehicle 100 is at a point having the distance C (a change from FIG. 13A to FIG. 13B), and narrows the illumination range longitudinally and also widens the illumination range laterally as viewed from the following vehicle when the vehicle 100 is at a point having the distance D (a change from FIG. 13B to FIG. 13C). As a result, the rear-road surface illumination apparatus can implicitly notify the driver of the following vehicle that the distance between the vehicles has been varying.

The changes as shown in FIGS. 9 to 13 can be combined.

Further, when making one of the changes as shown in FIGS. 9 to 13 to the deceleration stop re-quest display 101, the rear-road surface illumination apparatus can increase or decrease the speed of the change. As a result, the rear-road surface illumination apparatus can provide the driver of the following vehicle with a feeling of tension and an approximate feeling of distance.

For example, when the vehicle 100 is at a point having the distance A, the rear-road surface illumination apparatus decreases the speed of the change in such a way that the change of the deceleration stop request display 101 becomes unintelligible, when the vehicle 100 is at a point having the distance B, the rear-road surface illumination apparatus repeats the change at the same speed as that of the blinking of the hazard lamps, and when the vehicle 100 is at a point having the distance D, the rear-road surface illumination apparatus repeats the blinking at a speed higher than that of the hazard lamps. As a result, when the distance between the vehicles is long, the rear-road surface illumination apparatus can cause the driver of the following vehicle to sense that the position of the preceding vehicle is far away, thereby being able to prevent the driver of the following vehicle from having a feeling of tension, whereas when the distance between the vehicles is short, the rear-road surface illumination apparatus can cause the driver of the following vehicle to have a feeling of tension and sense that the distance to the preceding vehicle is getting narrower, thereby being able to induce the driver of the following vehicle to stop the following vehicle.

As mentioned above, the rear-road surface illumination apparatus according to the second embodiment is configured so as to include the inter-vehicle distance analyzer 20 configured to determine the distance between the vehicle and the following vehicle on the basis of the vehicle information acquired by the vehicle information acquisition unit 1, and to change the illumination information (e.g., the illumination range) depending on the distance between the vehicles. As a result, the rear-road surface illumination apparatus can notify the driver of the following vehicle about how long the distance between the vehicles is. Further, the rear-road surface illumination apparatus can appeal more strongly to the driver of the following vehicle for the existence of the vehicle. In addition, the rear-road surface illumination apparatus can provide a notification for the driver of the following vehicle without recourse to a display of characters.

Further, the inter-vehicle distance analyzer 20 according to the second embodiment increases the speed of the change of the animation having the illumination information when the distance between the vehicles is long, whereas the inter-vehicle distance analyzer increases the speed of the change when the distance between the vehicles is short. Therefore, by providing the animation, the rear-road surface illumination apparatus makes it easy for the driver of the following vehicle which is far away from the vehicle to notice that the road surface is illuminated with something.

Third Embodiment

Figure 14:
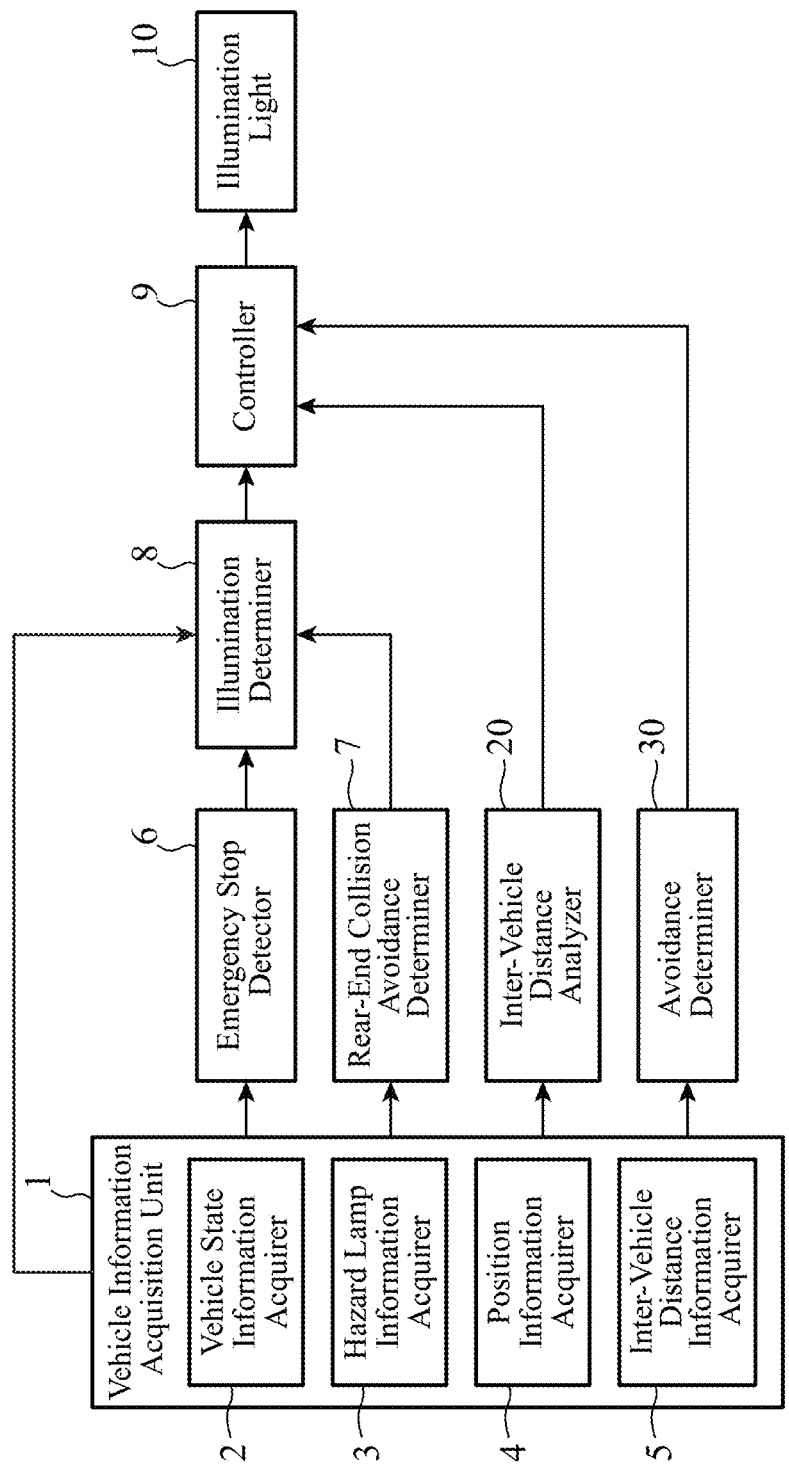
FIG. 14 is a block diagram showing the configuration of a rear-road surface illumination apparatus according to a third embodiment of the present invention.

FIG. 14 is a block diagram showing an example of the configuration of a rear-road surface illumination apparatus according to the third embodiment. In FIG. 14, the same components as those shown in FIGS. 1 and 4 or like components are designated by the same reference numerals, and the explanation of the components will be omitted hereafter. The rear-road surface illumination apparatus according to the third embodiment is configured so as to additionally include an avoidance determiner 30.

A vehicle information acquisition unit 1 outputs vehicle information also to the avoidance determiner 30 and an illumination determiner 8, as well as to an emergency stop detector 6, a rear-end collision avoidance determiner 7 and an inter-vehicle distance analyzer 20.

The avoidance determiner 30 determines whether to provide a display to induce a following vehicle to decelerate or stop or to provide a display to induce the following vehicle to travel while avoiding the vehicle, on the basis of the information acquired from the vehicle information acquisition unit 1, and, when determining that it is desirable to provide a display to induce the following vehicle to travel while avoiding the vehicle, instructs a controller 9 to use illumination information to lead to avoidance.

When instructed to use the illumination information to lead to avoidance by the avoidance determiner 30, the controller 9 controls an illumination light 10 according to the illumination information.

For example, there is a case in which when the following vehicle can avoid a rear-end collision if the following vehicle avoids the vehicle, the use of illumination information to induce the following vehicle to decelerate or stop notifies the driver of the following vehicle that the driver of the vehicle desires the driver of the following vehicle to decelerate or stop the following vehicle, and, as a result, worsens the traffic conditions.

Further, because according to the Japanese road traffic law, at the time of an emergency stop on a highway, the driver is obliged to place either a smoke candle or a warning triangle behind the vehicle, a passenger of the vehicle has to get out of the vehicle on a road in order to place either a smoke candle or a warning triangle, but only the hazard lamps are means for notifying an emergency stop to the surroundings of the vehicle while a passenger of the vehicle places a smoke candle or a warning triangle. It is therefore difficult for the driver of the following vehicle to notice persons ahead of the following vehicle and the vehicle which has made the emergency stop.

In such a case, the rear-road surface illumination apparatus notifies the driver of the following vehicle that the driver of the vehicle desires the driver of the following vehicle to be aware of a rear-end collision with the vehicle and to perform an avoiding operation, by illuminating a rear road surface behind the vehicle with light having illumination information.

Next, the operation of the rear-road surface illumination apparatus according to the third embodiment will be explained with reference to FIGS. 15 to 18.

FIG. 15 is a flow chart showing the operation of the rear-road surface illumination apparatus according to the third embodiment. Because processes in steps ST100 to ST102 and ST104 to ST108 of FIG. 15 are the same as those shown in FIG. 3, the explanation of the processes will be omitted hereafter. FIGS. 16A to 16E are diagrams showing examples of an avoidance request display 102 with which the rear road surface is illuminated in a state in which the vehicle 100 has made an emergency stop on a shoulder. FIGS. 17A to 17G are diagrams showing examples of the avoidance request display 102 corresponding to distances A to D. FIG. 18 is a diagram showing an example of how the avoidance request display 102 is viewed when the avoidance request display is viewed from the following vehicle 200.

When the emergency stop detector 6 detects that, deceleration or a stop of the vehicle is intended for an emergency stop (when "YES" in step ST101 or when "YES" in step ST102), the rear-road surface illumination apparatus, in the following step ST300, determines with which one of a deceleration stop request display and an avoidance request display the road surface is to be illuminated.

Step ST300 is a process of determining whether the traveling direction of the vehicle is toward a shoulder.

The avoidance determiner 30 acquires either information showing in which lane the current position of the vehicle is or information showing the traveling direction based on the motion of the steering wheel of the vehicle from a position information acquirer 4 of the vehicle information acquisition unit 1. The avoidance determiner 30 determines that the driving lane of the vehicle is the outermost one, on the basis of the acquired information, and also determines that the traveling direction of the vehicle is toward a shoulder on the basis of the motion of the steering wheel. In contrast, when the steering wheel does not turn to the right or the left, and the vehicle travels forward, the avoidance determiner 30 determines that the traveling direction of the vehicle is not toward a shoulder.

When the avoidance determiner 30 determines that the traveling direction of the vehicle is toward a shoulder (when "YES" in step ST300), the rear-road surface illumination apparatus instructs the controller 9 to switch to illumination information expressing an avoidance request display to lead to avoidance, and advances to step ST302. In contrast, when the avoidance determiner 30 determines that the traveling direction of the vehicle is not toward a shoulder (when "NO" in step ST300), the rear-road surface illumination apparatus instructs the controller 9 to switch to illumination information expressing a deceleration stop request display to lead to deceleration or a stop, and advances to step ST301.

Step ST301 is a process of illuminating a rear road surface with a deceleration stop request display.

After receiving the instruction to switch to illumination information expressing a deceleration stop request display from the avoidance determiner 30, the controller 9 controls the illumination light 10 to illuminate the rear road surface with the deceleration stop request display by performing the same process as that shown in step ST103 (FIG. 3) of the above-mentioned first embodiment.

In this step ST301, the rear-road surface illumination apparatus can perform the same processes as those shown in steps ST200 to ST208 (FIG. 5) of the above-mentioned second embodiment.

Step ST302 is a process of illuminating a rear road surface with an avoidance request display.

After receiving the instruction to switch to illumination information expressing an avoidance request display from the avoidance determiner 30, the controller 9 controls the illumination light 10 to illuminate the rear road surface with the avoidance request display 102, as shown in either of FIGS. 16A to 16E, to induce the driver of the following vehicle 200 to perform an avoiding operation. At this time, even if it is sensed on the basis of vehicle state information that the engine has been stopped and the driver has gotten out of the vehicle, the controller 9 instructs the illumination light 10 to continue illuminating the rear road, surface with the avoidance request display 102.

As a result, the rear-road surface illumination apparatus can implicitly notify the driver of the following vehicle that the vehicle has made an emergency stop and the driver of the vehicle desires the driver of the following vehicle to avoid the vehicle and pass by the vehicle, at an earlier time compared with that in the case of placing either a smoke candle or a warning triangle. Further, in a state of indicating the existence of the vehicle to the following vehicle in an enhanced way, the driver of the vehicle is enabled to place a smoke candle or the like.

The flow chart of FIG. 15 is an example and the operation of the rear-road surface illumination apparatus is not limited to the example shown in this flow chart.

As shown in each of FIGS. 16A to 16E, avoidance request, display 102 represents the pattern having an illumination range which has a wide lateral width in the vicinity of the vehicle 100, has the lateral width that decreases as the distance from the vehicle 100 increases, and is shifted to a shoulder as viewed from the following vehicle 200. As a result, the rear-road surface illumination apparatus can implicitly notify the driver of the following vehicle 200 that the driver of the vehicle desires the driver of the following vehicle 200 to move over to the right (toward the traffic lane) as viewed from the following vehicle 200.

The examples of the avoidance request display 102 shown in FIGS. 16A to 16E are the ones in the case of left-hand traffic. In the case of right-hand traffic, what is necessary is just to flip the display from right to left.

Further, one of the changes as shown in FIGS. 9 to 13 can be made to the avoidance request display 102, and, as a result, the indication of inducing the driver of the following vehicle 200 to perform an avoiding operation can be enhanced.

In addition, when making a stop on a shoulder during travel along a highway, according to the Japanese road traffic law, the driver is obligated to place either a smoke candle or a warning triangle at a distance of 50 meters behind the vehicle which has been stopped. In consideration of this rule, the rear-road surface illumination apparatus enlarges the illumination range of the avoidance request display 102 in such a way that the illumination range extends up to a distance of 50 meters or more behind the vehicle 100, thereby making it easy for the driver of the following vehicle 200 to notice a passenger who has gotten out of the vehicle in order to place a smoke candle or the like.

Further, the rear-road surface illumination apparatus, in step ST302, can perform the same processes as those in steps ST200 to ST208 (FIG. 5) of the above-mentioned second embodiment, and change the avoidance request display 102 to an avoidance request display having the illumination information corresponding to the distance between the vehicle and the following vehicle. A display example of implementing the second embodiment when illuminating the rear road surface with the avoidance request display 102 is shown in FIGS. 17A to 17G. For example, in the case of FIGS. 17A to 17G, when the vehicle 100 is at a point having the distance A, the rear-road surface illumination apparatus illuminates the rear road surface with the avoidance request display 102 shown in FIG. 16A in such a way that the avoidance request display gradually changes from that shown in FIG. 17A to that shown in FIG. 17B, and then to that shown in FIG. 17C. As a result, the rear-road surface illumination apparatus can implicitly notify the driver of the following vehicle 200 that the vehicle 100 has started decelerating.

Figure 16A:
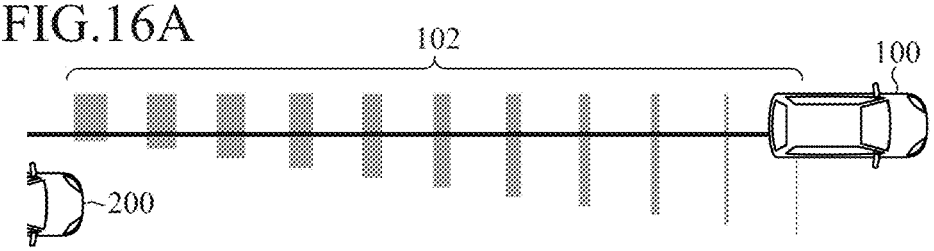
FIGS. 16A to 16E are diagrams showing examples of an avoidance request display with which a rear road surface is illuminated by the rear-road surface illumination apparatus according to the third embodiment.
Figure 16B:
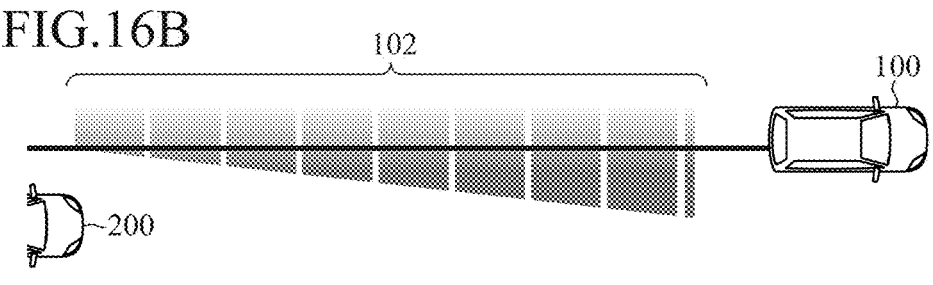
Figure 16C:
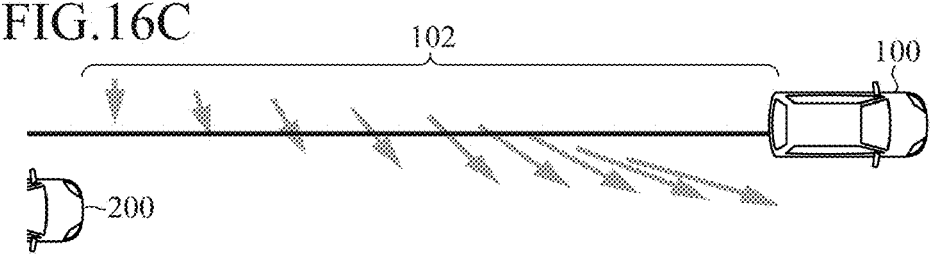
Figure 16D:
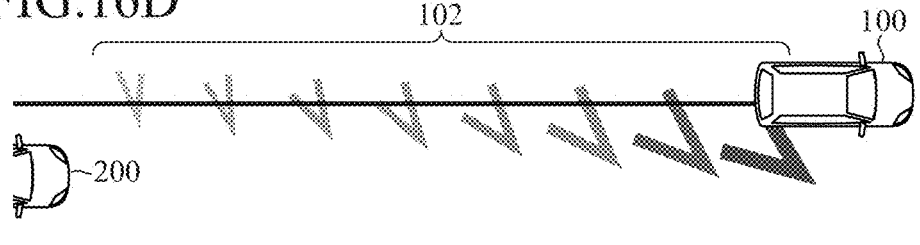
Figure 16E:
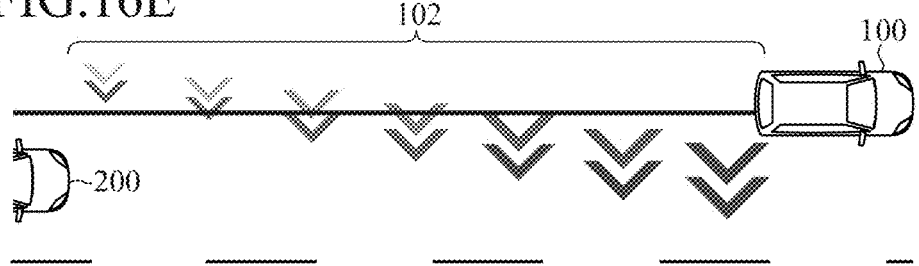
Figure 17A:
FIGS. 17A to 17G are diagrams showing examples of deceleration stop request displays having pieces of illumination information A1 to D1 respectively corresponding to distances A to D at each of which at vehicle is existing.
Figure 17B:
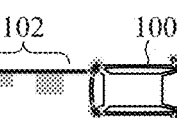
Figure 17C:
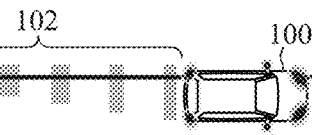
Figure 17D:
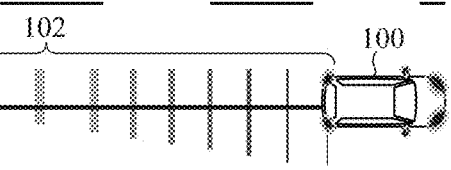
Figure 18:
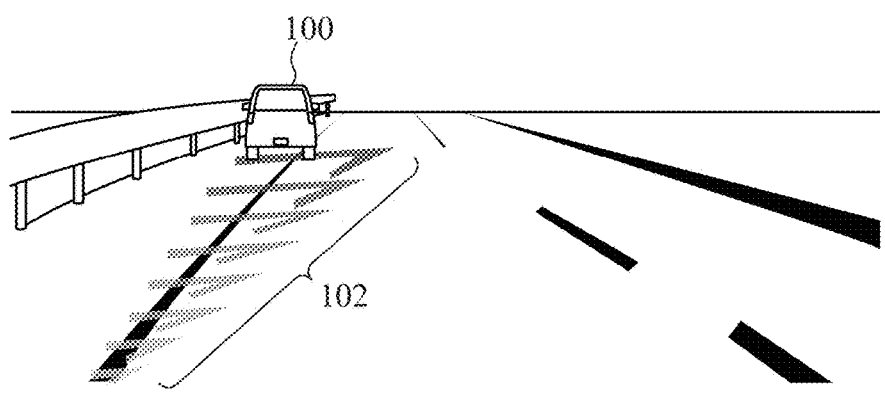
FIG. 18 is a diagram showing an example of how a deceleration stop request display is viewed when the avoidance request display is viewed from a following vehicle.

When the vehicle 100 is at a point having the distance B, the rear-road surface illumination apparatus can change the avoidance request display 102 shown in FIG. 17D in such a way that a fade-in from the left and a fade-out to the right are repeated as viewed from the following vehicle 200. As a result, the rear-road surface illumination apparatus can implicitly notify the driver of the following vehicle 200 that the driver of the vehicle desires the driver of the following vehicle 200 not to move over to the left in the lane, but move over to the right to avoid a rear-end collision with the vehicle 100. Further, at this time, as shown in FIG. 16B and FIG. 16E, the rear-road surface illumination apparatus can change the display color of the avoidance request display 102 in such a way that its left portion as viewed from the following vehicle 200 is colored orange while its right portion as viewed from the following vehicle is colored red.

Figure 17E:

When the vehicle 100 is at a point having the distance C, the rear-road surface illumination apparatus illuminates the rear road surface with the same avoidance request display 102 as that at the time that the vehicle is at a point having the distance B. As a result, the rear-road surface illumination apparatus can continue implicitly notifying the driver of the following vehicle 200 that the driver of the vehicle desires the driver of the following vehicle 200 not to move over to the left in the lane, but move over to the right to avoid a rear-end collision with the vehicle 100. Further, at this time, the rear-road surface illumination apparatus can change the display color of a portion in the vicinity of the vehicle 100 of the avoidance request display 102 to red while displaying a portion in the vicinity of the following vehicle 200 of the avoidance request display in orange, or, conversely, change the display color of the portion in the vicinity of the following vehicle 200 of the avoidance request display to red, as shown in FIG. 17E.

Figure 17F:
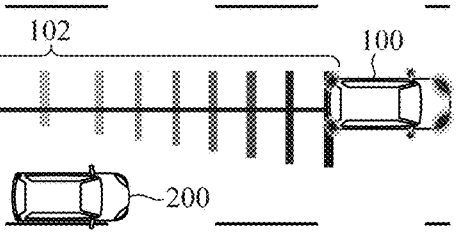

When the vehicle 100 is at a point having the distance D, the rear-road surface illumination apparatus can change the display color of a portion in the vicinity of the vehicle 100 of the avoidance request display 102 to red, or narrow the gap between graphics, as shown in FIG. 17F. As a result, the rear-road surface illumination apparatus can implicitly notify the driver of the following vehicle that the distance between the vehicle 100 and the following vehicle 200 is getting narrower. In the examples shown in FIGS. 16C, 16D and 16E, the rear-road surface illumination apparatus illuminates the rear road surface with arrows pointing left to right as viewed from the following vehicle 200, as the avoidance request display 102, and narrows the gap of arrows or changes the display sizes of the arrows as they get close to the vehicle 100.

Step ST303 is a process of determining whether the driver of the vehicle has manually stopped the operation of the rear-road surface illumination apparatus.

Figure 17G:

The illumination determiner 8 acquires vehicle state information from a vehicle state information acquirer 2 of the vehicle information acquisition unit 1, and determines whether the driver has manually stopped the operation of the rear-road surface illumination apparatus. When determining that the driver has manually stopped the operation of the rear-road surface illumination apparatus (when "YES" in step ST303), the illumination determiner 8 outputs an instruction to stop the illumination to the controller 9, and advances to step ST305. In contrast, when determining that the driver has not manually stopped the operation of the rear-road surface illumination apparatus (when "NO" in step ST303), the illumination determiner 8 outputs an instruction to continue illuminating to the controller 9, and advances to step ST304. A state in which the illumination of the avoidance request display 102 is ended is shown in FIG. 17G.

Step ST304 is a process of determining whether the vehicle has moved to a safe location.

The illumination determiner 8 acquires the vehicle state information from the vehicle state information acquirer 2 of the vehicle information acquisition unit 1 and also acquires position information from the position information acquirer 4, and determines whether the vehicle has moved to a safe location. When the vehicle has moved to a location other than the road from the point where the vehicle has made an emergency stop, with the engine off, it can be assumed that the vehicle has moved to a safe location. When determining that the vehicle has moved to a safe location (when "YES" in step ST304), the illumination determiner 8 outputs an instruction to stop the illumination to the controller 9, and advances to step ST305. In contrast, when determining that the vehicle has not moved to a safe location (when "NO" in step ST304), the illumination determiner 8 outputs an instruction to continue illuminating to the controller 9, and advances to step ST302.

Step ST305 is a process of ending the illumination of the avoidance request display.

After receiving the instruction to stop the illumination from the illumination determiner 8, the controller 9 controls the illumination light 10 to end the operation of illuminating the rear road surface with the avoidance request display.

As mentioned above, the rear-road surface illumination apparatus according to the third embodiment includes the avoidance determiner 30 to determine whether or not the traveling direction of the vehicle is toward a shoulder on the basis of the vehicle information acquired by the vehicle information acquisition unit 1, and the controller 9 is configured so as to, when the avoidance determiner 30 determines that the traveling direction of the vehicle is toward a shoulder, cause the illumination light to illuminate a rear road surface with light having illumination information which is intended to induce the following vehicle to avoid the vehicle, and in which the illumination range varies in a direction from a traffic lane to the shoulder with distance in a backward direction from the vehicle. By displaying the illumination information using an illusion on the road surface, the rear-road surface illumination apparatus can notify the driver of the following vehicle about an action which the driver of the vehicle desires the driver of the following vehicle to take, without inviting misunderstanding. More specifically the rear-road surface illumination apparatus can notify the driver of the following vehicle that the driver of the vehicle desires the driver of the following vehicle to foe aware of a rear-end collision with the vehicle and to perform an avoiding operation. Further, the rear-road surface illumination apparatus can make such a notification at an earlier time compared with that in the case of placing a smoke candle or the like.

Further, the controller 9 according to the third embodiment is configured so as to illuminate a range of up to 50 meters or more from the rear of the vehicle with light having illumination information when the avoidance determiner 30 determines that the traveling direction of the vehicle is toward a shoulder. As a result, the rear-road surface illumination apparatus makes it easy for the driver of the following vehicle to notice a passenger who has gotten out of the vehicle to place a smoke candle or the like.

While the present invention has been described in its preferred embodiments, it is to be understood that an arbitrary combination of two or more of the above-mentioned embodiments can be made, various changes can be made in an arbitrary component according to any one of the above-mentioned embodiments, and an arbitrary component according to any one of the above-mentioned embodiments can be omitted within the scope of the invention.

INDUSTRIAL APPLICABILITY

Because the rear-road surface illumination apparatus according to the present invention causes the illumination light to illuminate a rear road surface with light having illumination information expressing attraction of attention to a rear-end collision at the time of either an emergency stop or deceleration intended for an emergency stop, the rear-road surface illumination apparatus is suitable for use as a rear-road surface illumination apparatus that notifies either an emergency stop or deceleration to a following vehicle.

REFERENCE SIGNS LIST

1: vehicle information acquisition unit, 2: vehicle state information acquirer, 3: hazard lamp information acquirer, 4: position information acquirer, 5: inter-vehicle distance information acquirer, 6: emergency stop detector, 7: rear-end collision avoidance determiner, 8: illumination determiner, 9: controller, 10: illumination light, 20: inter-vehicle distance analyzer, 30: avoidance determiner, 100: vehicle, 101: deceleration stop request display, 102: avoidance request display, and 200: following vehicle.

The invention claimed is:

1. A rear-road surface illumination apparatus comprising:
a vehicle information acquisition unit to acquire vehicle information from vehicle-mounted equipment mounted in a primary vehicle;
an avoidance determiner to determine whether to provide a display to induce a following vehicle to avoid said primary vehicle, on a basis of the vehicle information acquired by said vehicle information acquisition unit; and
a controller to cause an illumination light mounted in said primary vehicle to illuminate a rear road surface with light having illumination information that induces said following vehicle to avoid said primary vehicle, when said avoidance determiner determines to provide a display to induce said following vehicle to avoid said primary vehicle, wherein
said avoidance determiner determines whether or not a traveling direction of said primary vehicle is toward a shoulder on a basis of the vehicle information acquired by said vehicle information acquisition unit; and
when said avoidance determiner determines that the traveling direction of said primary vehicle is toward a shoulder, said controller causes said illumination light to illuminate the rear road surface with the light having the illumination information which is intended to induce said following vehicle to avoid said primary vehicle, the illumination information indicating the illumination range that varies in a direction from a traffic lane to the shoulder with distance in a backward direction from said primary vehicle.

2. The rear-road surface illumination apparatus according to claim 1, wherein, when said avoidance determiner determines that the traveling direction of said primary vehicle is toward a shoulder, said controller causes said illumination light to illuminate a range of 50 meters or more behind said primary vehicle with the light having said illumination information which is intended to induce said following vehicle to avoid said primary vehicle.

* * * * *